United States Patent
Peckerar et al.

(10) Patent No.: US 9,484,155 B2
(45) Date of Patent: Nov. 1, 2016

(54) THIN FLEXIBLE RECHARGEABLE ELECTROCHEMICAL ENERGY CELL AND METHOD OF FABRICATION

(75) Inventors: Martin C. Peckerar, Silver Spring, MD (US); Neil Goldsman, Takoma Park, MD (US); Yves Ngu, Essex, VT (US); Zeynep Dilli, Hyattsville, MD (US); George M. Metze, Millersville, MD (US)

(73) Assignees: University of Maryland, College Park, MD (US); National Security Agency, Ft. Meade, MD (US)

( * ) Notice: Subject to any disclaimer, the term of this patent is extended or adjusted under 35 U.S.C. 154(b) by 2046 days.

(21) Appl. No.: 12/505,823

(22) Filed: Jul. 20, 2009

(65) Prior Publication Data

US 2010/0028766 A1    Feb. 4, 2010

Related U.S. Application Data

(60) Provisional application No. 61/081,998, filed on Jul. 18, 2008.

(51) Int. Cl.
*H01G 11/00* (2013.01)
*H01G 5/00* (2006.01)
(Continued)

(52) U.S. Cl.
CPC .............. *H01G 9/042* (2013.01); *H01G 9/058* (2013.01); *H01G 9/155* (2013.01); *H01G 9/28* (2013.01);
(Continued)

(58) Field of Classification Search
CPC ...... H01G 11/30; H01G 11/46; H01G 11/44; H01G 5/15; H01G 9/02; H01G 9/042; H01G 9/155; H01G 9/28; H01G 9/058; H01G 11/42; H01M 4/0402; H01M 4/048; H01M 4/583; H01M 10/36; H01M 12/005; H01M 10/0436; Y10T 29/49155; Y10T 29/49114; Y02E 60/13

USPC ........................................ 429/209–231, 218.1
See application file for complete search history.

(56) References Cited

U.S. PATENT DOCUMENTS

2002/0018938 A1*  2/2002  Takeuchi et al. ............. 429/317
2002/0182503 A1* 12/2002  Asari et al. ................ 429/231.1
(Continued)

FOREIGN PATENT DOCUMENTS

WO    WO-2005-121022    * 12/2005
WO    WO-2008/027051    *  3/2008
(Continued)

OTHER PUBLICATIONS

Zheng et al ("A New Charge Storage Mechanism for Electrochemical Capacitors", J. Electrochem. Soc., vol. 142, No. 1, Jan. 1995).*

*Primary Examiner* — Milton I Cano
*Assistant Examiner* — Stephen Yanchuk
(74) *Attorney, Agent, or Firm* — Rosenberg, Klein & Lee

(57) ABSTRACT

A thin, rechargeable, flexible electrochemical energy cell includes a battery cell, or a capacitor cell, or a battery/capacitor hybrid cell that can be stackable in any number and order. The cell can be based on a powdery mixture of hydrated ruthenium oxide particles or nanoparticles with activated carbon particles or nanoparticles suspended in an electrolyte. The electrolyte may contain ethylene glycol, boric acid, citric acid, ammonium hydroxide, organic acids, phosphoric acid, and/or sulphuric acid. An anode electrode may be formed with a thin layer of oxidizable metal (Zn, Al, or Pb). The cathode may be formed with a graphite backing foil. The energy cell may have a voltage at or below 1.25V for recharging. The thickness 15 of the cell structure can be in the range of 0.5 mm-1 mm, or lower.

27 Claims, 14 Drawing Sheets

(51) Int. Cl.
  *H01G 9/00*    (2006.01)
  *H01M 4/00*    (2006.01)
  *H01M 10/00*   (2006.01)
  *H01G 9/042*   (2006.01)
  *H01G 9/04*    (2006.01)
  *H01G 9/28*    (2006.01)
  *H01G 11/42*   (2013.01)
  *H01G 11/46*   (2013.01)
  *H01M 4/04*    (2006.01)
  *H01M 4/48*    (2010.01)
  *H01M 4/583*   (2010.01)
  *H01M 10/04*   (2006.01)
  *H01M 10/36*   (2010.01)
  *H01M 12/00*   (2006.01)
  *H01G 11/30*   (2013.01)
  *H01M 2/02*    (2006.01)

(52) U.S. Cl.
  CPC .............. *H01G 11/42* (2013.01); *H01G 11/46* (2013.01); *H01M 4/0402* (2013.01); *H01M 4/48* (2013.01); *H01M 4/583* (2013.01); *H01M 10/0436* (2013.01); *H01M 10/36* (2013.01); *H01M 12/005* (2013.01); *H01G 11/30* (2013.01); *H01M 2002/0205* (2013.01); *Y02E 60/13* (2013.01); *Y10T 29/49114* (2015.01); *Y10T 29/49115* (2015.01)

(56) References Cited

U.S. PATENT DOCUMENTS

| | | | |
|---|---|---|---|
| 2003/0124423 A1* | 7/2003 | Sasaki et al. | 429/221 |
| 2003/0133254 A1* | 7/2003 | Chen | 361/517 |
| 2004/0089540 A1* | 5/2004 | Van Heuveln | C01G 51/68 204/293 |
| 2005/0084758 A1* | 4/2005 | Yamamoto et al. | 429/231.4 |
| 2006/0047030 A1* | 3/2006 | Yoshida et al. | 524/99 |
| 2006/0166810 A1* | 7/2006 | Gunderman et al. | 502/64 |
| 2006/0183022 A1* | 8/2006 | Takahashi et al. | 429/213 |
| 2007/0099080 A1* | 5/2007 | Pickett et al. | 429/188 |
| 2008/0048153 A1* | 2/2008 | Naoi | 252/506 |
| 2008/0131763 A1* | 6/2008 | Buiel et al. | 429/149 |
| 2008/0241656 A1* | 10/2008 | Miller | 429/122 |
| 2008/0318128 A1* | 12/2008 | Simoneau et al. | 429/229 |
| 2009/0059474 A1* | 3/2009 | Zhamu et al. | 361/503 |
| 2010/0110612 A1* | 5/2010 | Zhong et al. | 361/502 |

FOREIGN PATENT DOCUMENTS

| | | | |
|---|---|---|---|
| WO | WO-2008-070914 | * | 6/2008 |
| WO | WO-2008/070914 | * | 6/2008 |

* cited by examiner

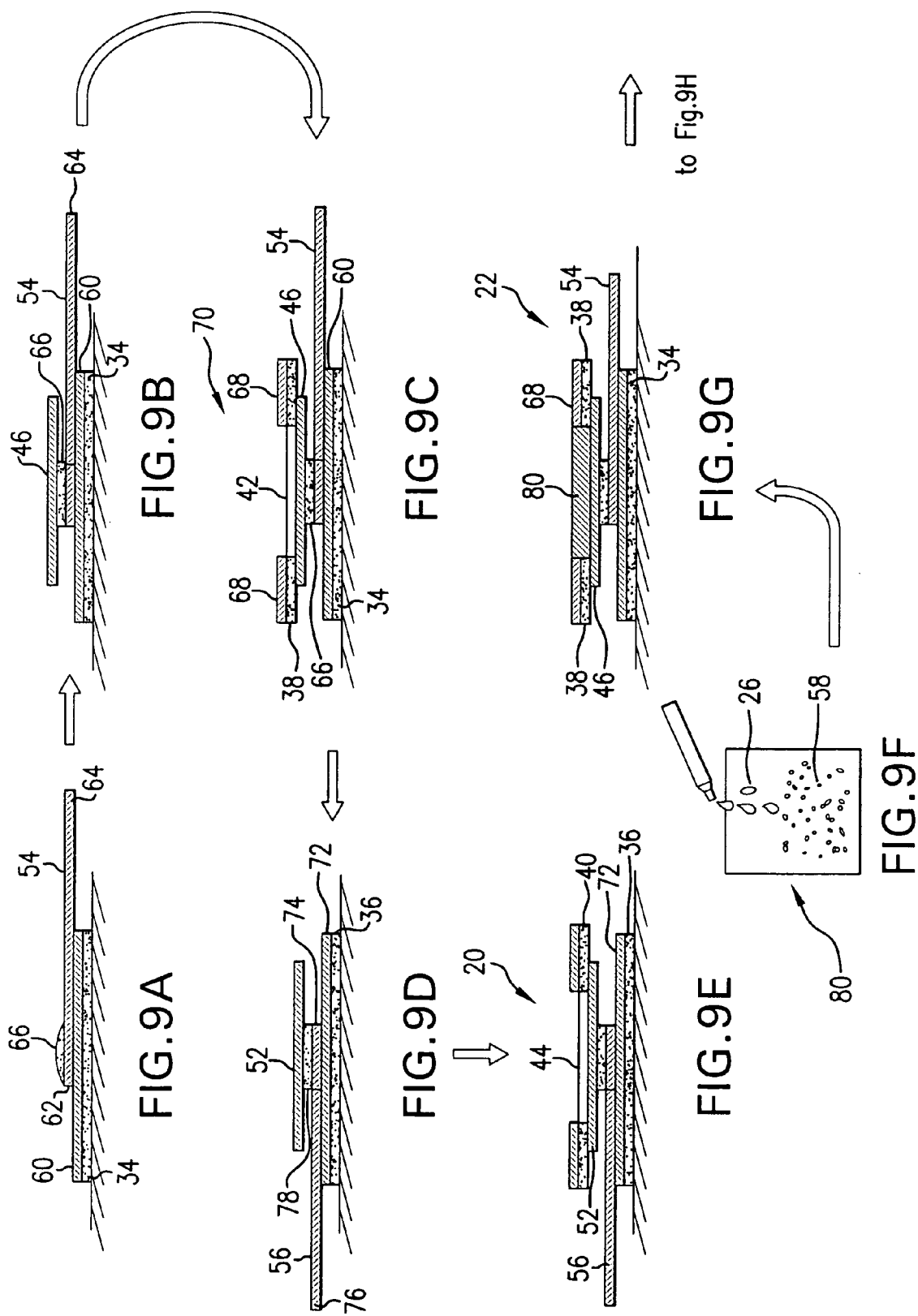

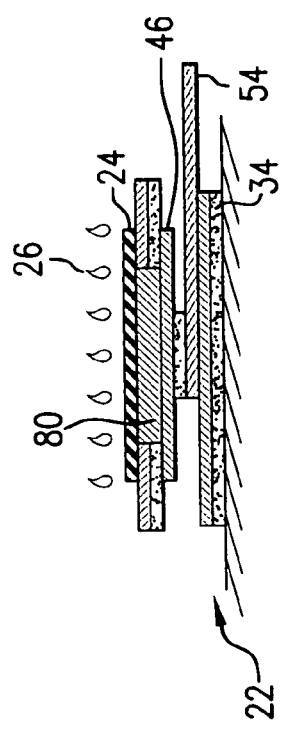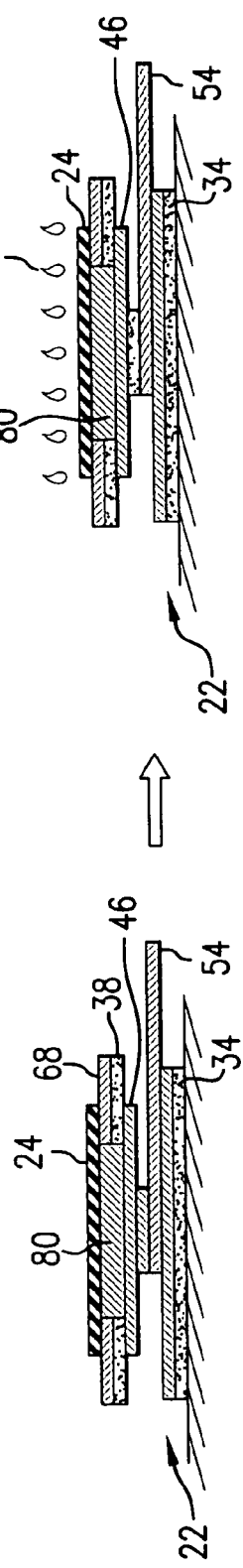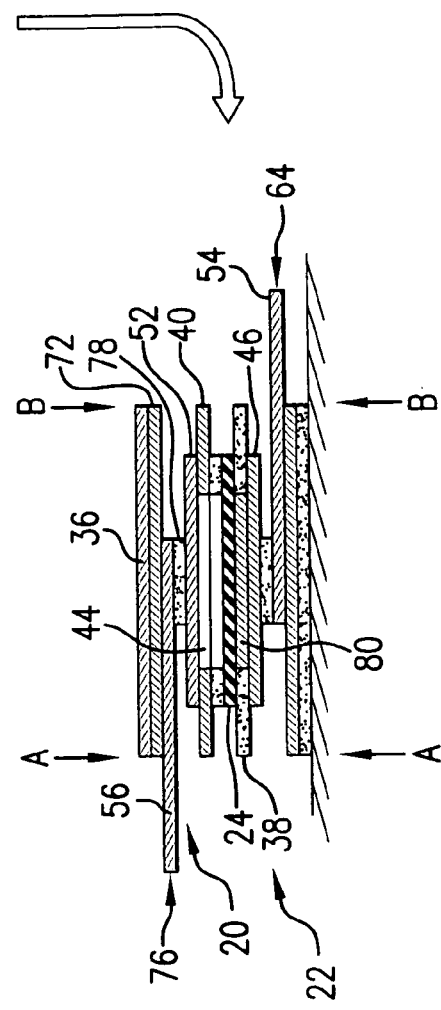

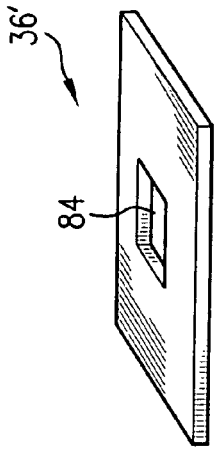
FIG.10A
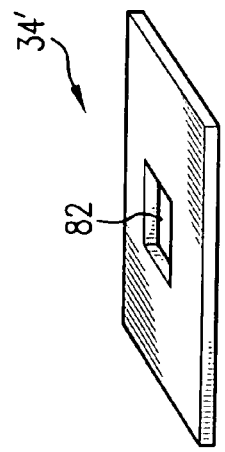
FIG.10B
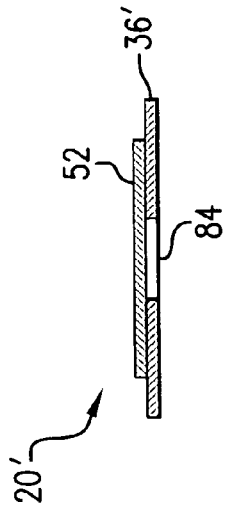
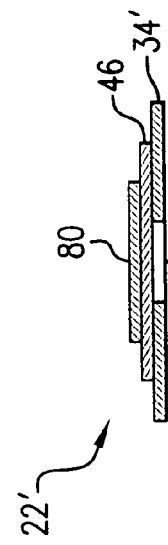
FIG.10C
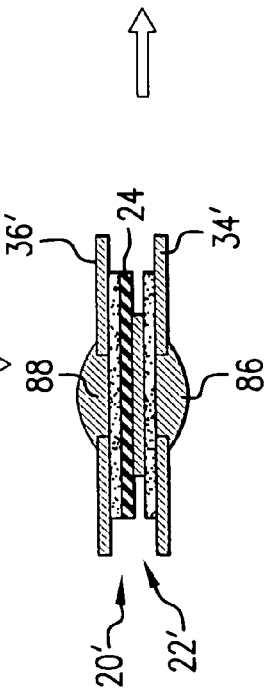
FIG.10D

THIN FLEXIBLE RECHARGEABLE ELECTROCHEMICAL ENERGY CELL AND METHOD OF FABRICATION

CROSS-REFERENCE TO RELATED APPLICATION

This utility patent application claims the benefit of priority to U.S. Provisional Patent Application No. 61/081,998, entitled "Flexible, High Specific Energy Density, Rechargeable Battery," filed on Jul. 18, 2008, the disclosure of which is incorporated by reference.

The U.S. Government has a paid-up license in this invention and the right in limited circumstances to require the patent owner to license others on reasonable terms as provided for by the terms of NSA Contract #H9823004CO490 awarded by the NSA.

TECHNICAL FIELD

This disclosure is directed to electrochemical energy cells. Some embodiments may relate to thin, flexible rechargeable battery and/or capacitor cells that can be integrated into a flexible electronics matrix.

Some embodiments may relate to a rechargeable high capacitance battery cell, in which the cell can include a powdery mixture of hydrated ruthenium oxide particles or nanoparticles and activated carbon particles or nanoparticles suspended in an electrolyte.

Some embodiments may relate to an electrochemical energy cell that can provide capacitive storage with electrochemical power generation by combining a rechargeable thin flexible battery with a thin, flexible capacitor in a single-hybrid system to form a thin, flexible energy cell for various applications, such as for hybrid system to form a thin, flexible energy cell for various applications, such as for powering a Distributed Networks Node device.

BACKGROUND

The operation of a battery can be based on electrochemical reactions in which electrons are produced. The electrons can flow from the negative terminal of the battery to the positive terminal, and, if a load is connected between the positive and negative terminals, the electrical current produced by the battery can flow therethrough.

A battery can "hold" power for a long period of time when in a dormant state until electrons flow from the negative to the positive terminal. The chemical reaction can be launched once an electric load is created between the positive and negative terminals. In some batteries, an electrical circuit can be created when one material oxidizes, or gives up electrons, while another material immersed in an electrolyte becomes reduced, or gains electrons. Opposingly, when a rechargeable battery is plugged into an electrical outlet, the flow of electrons can be reversed so that the material that oxidizes during discharge gains electrons, while the other material gives up electrons. Rechargeable batteries are widely used in cordless power tools, cell phones, laptop computers, digital cameras, two-way radios, etc., due to their ability to be recharged numerous times.

A capacitor can refer to a passive electronic component that stores energy in the form of an electrostatic field. In its simplest form, the capacitor can include a pair of conducting plates separated by an insulating material, e.g., a dielectric. The capacitance can be directly proportional to the surface area of the plates, and can be inversely proportional to the separation between the plates. Capacitance of the capacitor may also depend on the dielectric constant of the substance separating the plates.

SUMMARY

Some aspects of some embodiments may involve a rechargeable flexible (e.g., bendable, twistable) battery that may be integrated in a flexible electronics matrix, and which may be applicable for powering distributed networks node devices.

Some embodiments involve a rechargeable electrochemical energy cell that has at least one rechargeable battery cell including: an anode electrode unit; a cathode electrode unit; and a first electrolyte body sandwiched between the anode and cathode electrode units, in which the cathode electrode unit includes a cathode material having a powder mixture of a powder of hydrated ruthenium oxide ($RuO_2 \times H_2O$) with activated carbon (AC) particles or nanoparticles suspended in a second electrolyte body.

Some aspects of some embodiments may include thin batteries requiring low (e.g., below 1.25 volts) charge voltages, and which may be safe in use. Some aspects of some embodiments may involve a thin rechargeable flexible battery with high capacity that can have a maximized active surface for efficient electrochemical reactions in the cell, which can be attained by using a powdered mixture of hydrated ruthenium oxide particles or nanoparticles and activated carbon particles or nanoparticles suspended in an electrolyte.

Some aspects of some embodiments may include a hybrid rechargeable flexible battery/capacitor structure, which can be based on the cathode active material, including a powder mixture of the hydrated ruthenium oxide and activated carbon particles or nanoparticles.

Some aspects of some embodiments may involve a stacked cell structure of multiple batteries cells connected in series or parallel, which can have small overall volume, low charge voltage, and which may be contained within a Lexan package that is acid resistant and sealed using its own adhesive layer or within a flexible plastic package that is acid resistant and easily sealed using its own adhesive layer.

Some aspects of some embodiments may include a rechargeable flexible battery/capacitor electrochemical energy cell that can have a simple manufacturing process and can be highly efficient in operation.

Some aspects of some embodiments may involve an electrochemical energy cell that may include at least one rechargeable thin flexible battery unit, but which can have any number of the flexible thin battery cells stacked on each other and connected in series or parallel. The battery cell(s) may also be combined with capacitor(s) in a hybrid unit to intermittently operate in either power producing or power conserving modes, or in different power sourcing modes. The connections in such a stack or combination may be internal or external to the packaging.

Some aspects of some embodiments may involve a rechargeable battery unit that may include a thin anode electrode unit, and a thin cathode electrode unit with an expanded active surface area, and having an electrolyte body sandwiched between the thin anode and cathode electrode unit.

Some embodiments of the thin anode electrode unit can include a layer of an oxidizable metal, such as for example, zinc, aluminum, or lead. The oxidizable metal can be either a sheet of the oxidizable metal or may include a sputter-coated metal powder on a flexible backing material.

Some embodiments of the cathode electrode unit can include a cathode material having a powder mixture of a powder of hydrated ruthenium oxide particles or nanoparticles with activated carbon particles or nanoparticles mixed in a volumetric relationship. The powdered mixture may be suspended in an electrolyte body to form a paste. The powder mixture may vary over a wide range of volume ratios between the powder of hydrated ruthenium oxide and the powder of activated carbon, depending on the individual application.

In some embodiments, the volume ratio of the powder of $RuO_2 \times H_2O$ and powder of AC in said powder mixture can vary in a range from 0%:100% volume ratio to 100%:0% volume ratio. In some embodiments, the volume ratio can be approximately 50%:50%. In some embodiments, each of the first and second electrolyte bodies can have a pH in the range of 3 to 6.5. A range of a thickness of the rechargeable electrochemical energy cell can be 1 mm or lower.

Some embodiments of the electrolyte in which the powder mixture is suspended may include materials from a group of materials, in which some embodiments, may include ethylene glycol, boric acid, citric acid and ammonium hydroxide. In some embodiments, this solution can be a mixture of approximately 45% of ethylene glycol, 37% boric acid, 18% citric acid and 0.5 ml ammonium hydroxide per 100 ml of the electrolyte solution. Other electrolyte compositions may be utilized as well.

Some embodiments may include a permeable electrically insulating separator layer saturated with the electrolyte, and sandwiched between the anode and cathode electrode units contiguous to the cathode material and a material of the anode electrode unit. The separator layer can be a material that is porous to ions in liquid and is electrically non-conductive. The separator layer may be formed from a material including glass fiber filter paper, cleanroom-grade tissue paper, styrene-grafted fluorinated ethylene polypropylene, etc.

Some embodiments of the structure may include a flexible backing layer of conductive graphite, which backs the cathode material spread thereon in a predetermined active area. The surface of the graphite foil may have corrugations, serrations, grooves, holes, etc., to further expand and maximize the active area of the electrochemical cell. Positive and negative lead contacts can be electrically connected to the cathode electrode unit and the anode electrode unit, respectively.

In some hybrid implementations of the electrochemical energy cell, a capacitor cell can be packaged together with the battery cell in a battery capacitor hybrid structure, where connections can be made to integrate the capacitor in parallel with the battery. The capacitor cell may include a pair of flexible graphite layers, and a paste containing a powder mixture of the powder of hydrated ruthenium oxide particles or nanoparticles with activated carbon particles or nanoparticles (or alternatively, just activated carbon powder) suspended in the electrolyte. The paste may be dispersed on a predetermined active area of each flexible graphite layer. An insulator layer (e.g., a dielectric layer) can be sandwiched between the graphite layers. The capacitor cell may include first and second contacts, each of which may be electrically coupled to a respective one of the pair of flexible graphite layers. The capacitor cell may be constructed with asymmetrical electrodes, with the paste used on only one of the two electrodes.

Some aspects of some embodiments may involve a method of fabricating a flexible thin rechargeable electrochemical cell. The method may involve forming a graphite backing layer of predetermined dimensions from a flexible graphite foil (corrugations may be formed on the surface of the graphite foil), identifying a predetermined active area on a respective surface of the graphite layer, and mixing a powder mixture from a predetermined quantity of a powder of hydrated ruthenium oxide and a powder of activated carbon. The method may involve preparing a paste from the powder mixture and an electrolyte, depositing the paste on the active area on the backing graphite layer, thereby forming a cathode electrode unit. The method may involve forming a metal anode electrode layer, forming a separator layer of predetermined dimensions from a permeable electrical insulating material, positioning the separator layer on the cathode electrode unit contiguous to the paste dispersed on the active area, impregnating the separator layer with the electrolyte, and attaching the metal anode electrode layer to the cathode electrode unit with the separator layer sandwiched therebetween.

Some aspects of some embodiments may involve a first contact strip attached between the bottom of the graphite backing layer and the bottom seal layer, with an end of the first contact strip extending beyond an edge thereof. A second contact strip can be attached between a top seal layer and the metal anode electrode layer, with an end of the second contact strip extending beyond an edge of the top seal layer. The top and bottom seal layers can be adhered each to the other at the perimeter of the cell, thus forming a sealing package enveloping the cell.

Some aspects of some embodiments may involve a method for forming negative and positive contact leads. The method can involve cutting a contact hole in a bottom seal layer and in a top seal layer, fixing the bottom seal layer to the graphite backing layer, adhering the top seal layer to the metal anode layer, and attaching first and second contact leads to the graphite backing layer and the metal anode electrode layer through contact holes formed therein, respectively. The first and second contact leads can extend in different directions.

Some aspects of some embodiments may involve a method for production of hybrid structure. The method can involve forming a capacitor cell by sandwiching a dielectric separator layer between a pair of flexible graphite layers with the paste deposited thereon (corrugations may be formed on the surface of each graphite layer underlying the paste), and attaching the capacitor cell with internal or external contacts in parallel to the flexible battery cell, thereby forming a hybrid battery/capacitor structure.

Some embodiments can involve an electrochemical cell that includes an anode electrode layer, a cathode electrode layer, and a first electrolyte body sandwiched between the anode and the electrode layers. In these embodiments, the cathode electrode layer includes a cathode material having at least a powder mixture of a powder of an oxide with activated carbon (AC) particles or nanoparticles suspended in a second electrolyte body. The electrochemical cell is bendable and twistable to form a non-planar shape, and the electrochemical cell is configured for a reduction-oxidation (redox) reaction to generate power at a surface of one of the electrode layers.

In these embodiments, the electrochemical cell can be 1 mm or less in thickness, and/or be less than 4 grams. The first electrolyte body can be approximately PH-neutral (~7). The oxide can include hydrated ruthenium oxide ($RuO_2 \times H_2O$) or manganese oxide. At least one of the electrodes can include lead (Pb). The first electrolyte body can include citric acid. The anode electrode layer can include aluminum (Al). The electrochemical cell can include a separator layer sandwiched between the anode and cathode electrode layers, in which the separator layer can include a material that is porous to ions in liquid and is electrically non-conductive. A shape of the electrochemical cell and positions of the electrode layers on the electrochemical cell can be configured for stacking with another electrochemical cell to electrically form a serial or parallel connection with the other electrochemical cell upon stacking. The electrochemical cell can be non-toxic and noncombustible.

Some embodiments may involve an electrochemical cell that includes a battery cell and a capacitor cell. The battery cell includes an anode electrode layer, a cathode electrode layer, and a first electrolyte body sandwiched between the anode and the electrode layers, in which the cathode electrode layer includes a cathode material having a first powder mixture of an oxide with activated carbon (AC) particles or nanoparticles suspended in a second electrolyte body. The capacitor cell is electrically coupled to the battery cell. The capacitor cell includes a pair of graphite layers, an insulator layer sandwiched between the graphite layers, and a paste having a second powder mixture of the oxide with the activated carbon particles or nanoparticles suspended in a third electrolyte body, in which the paste is dispersed on a predetermined area of each of the graphite layers. The electrochemical cell can be a hybrid battery/capacitor structure, where a thickness of the electrochemical cell can be 1 mm or less, and the electrochemical cell can be bendable and twistable to form a non-planar shape.

In some embodiments, a single or multiple cell electrochemical energy cell structure including stacked battery cells may be created by the present method depending on the application and the power needed for powering the electronics.

Embodiments can include a miniature device that offers capacitive storage (capacitor) along with power generation (battery) in a single battery/capacitor hybrid implementation.

Some embodiments involve electrochemical energy cells that can provide an environmentally safe, thin flexible energy cell that has a charge voltage at or below 1.25 volts, and may not impose a danger of explosion during their operation.

The details of one or more implementations are set forth in the accompanying drawings and the description below. Other features will be apparent from the description and drawings, and from the claims.

BRIEF DESCRIPTION OF THE DRAWINGS

FIGS. 9A-9J represent a sequence of operations of an example method;

FIGS. 10A-10D represent a sequence of operations of an example method

DETAILED DESCRIPTION OF EXAMPLE EMBODIMENTS

In the following description, for the purposes of explanation, numerous specific details are set forth in order to provide a thorough understanding of various example embodiments. It will be apparent, however, that some of these embodiments may be practiced without these specific details. The details of one or more embodiments are set forth in the accompanying drawings and the description below. Other features, objects, and aspects are apparent from the description and drawings, and from the claims.

Recent advancements in the energy cell design, e.g., thin film battery technology, is a promising development that provides not only thin, but also flexible batteries which are sufficiently small so as to enable implementations of numerous applications having volume constraints, such as embedded sensors and wireless sensor networks. The disclosed embodiments describe thin film batteries that can provide an extremely small and thin physical size, which may aid in "energy harvesting".

In "energy harvesting" applications, energy can be captured and/or stored, in which the energy may be generated by other sources, such as solar, wind, water, vibrational, radio wave, or thermal energy sources. In some cases, when combined with "energy harvesting" features, thin film batteries may allow the device they are powering to remain in the field almost indefinitely or at least outlive the application. The disclosed thin film batteries can be operational throughout a broad range of temperature ranges, making them ideal for many ruggedized applications and environments. The disclosed thin film batteries may have little to no toxic effects to the environment, and may be nonexplosive and nonflammable. Some embodiments of the disclosed batteries may also operate at a voltage of around 1V.

Figure 1:
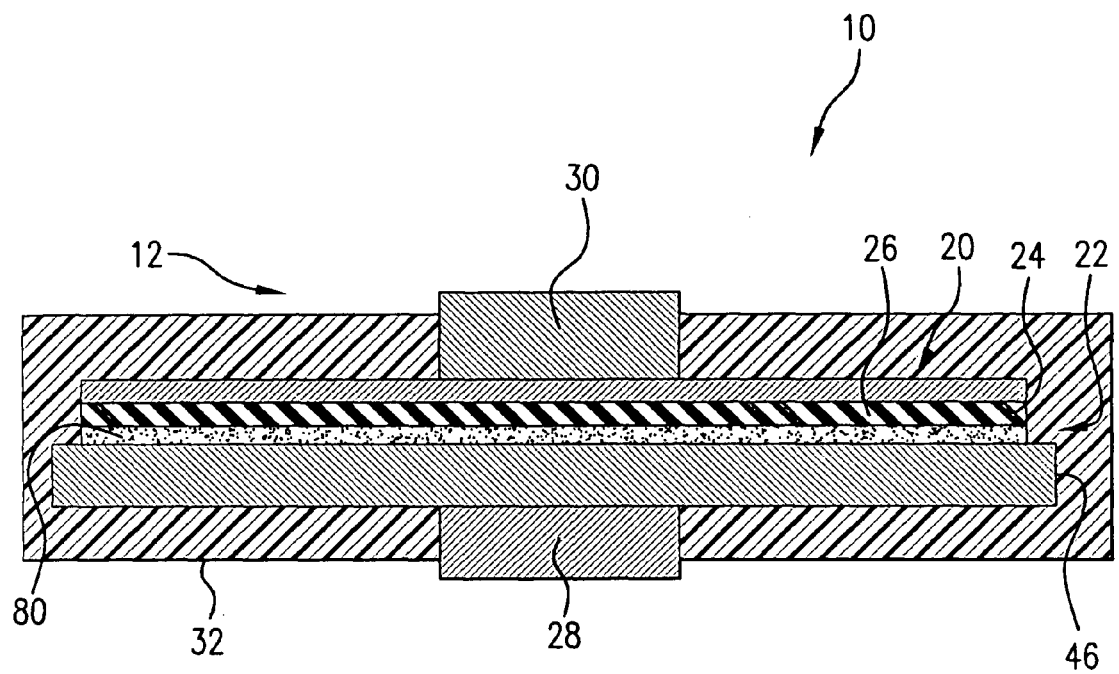
FIG. 1 is a simplified schematic representation of an example of a cross-section of the battery cell.
Figure 2:
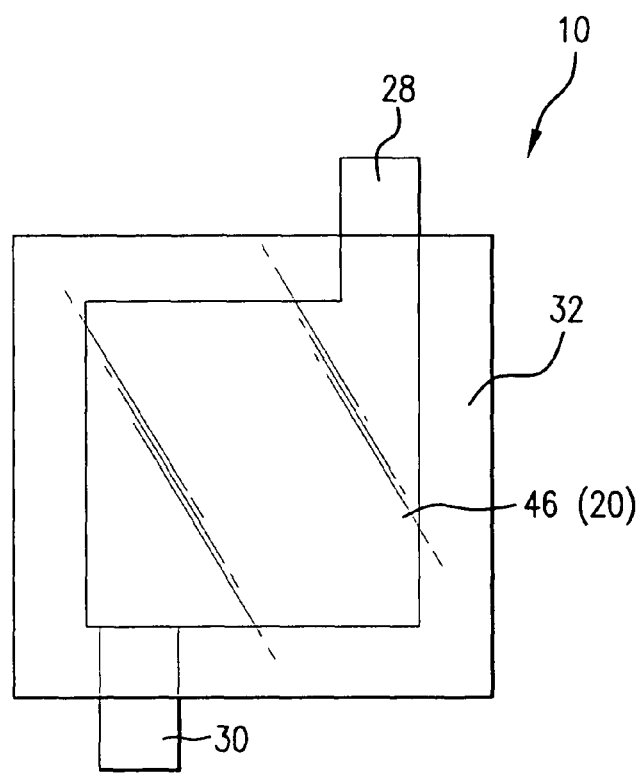
FIG. 2 is a top and/or bottom view of an example of the electrochemical energy cell.
Figure 3:
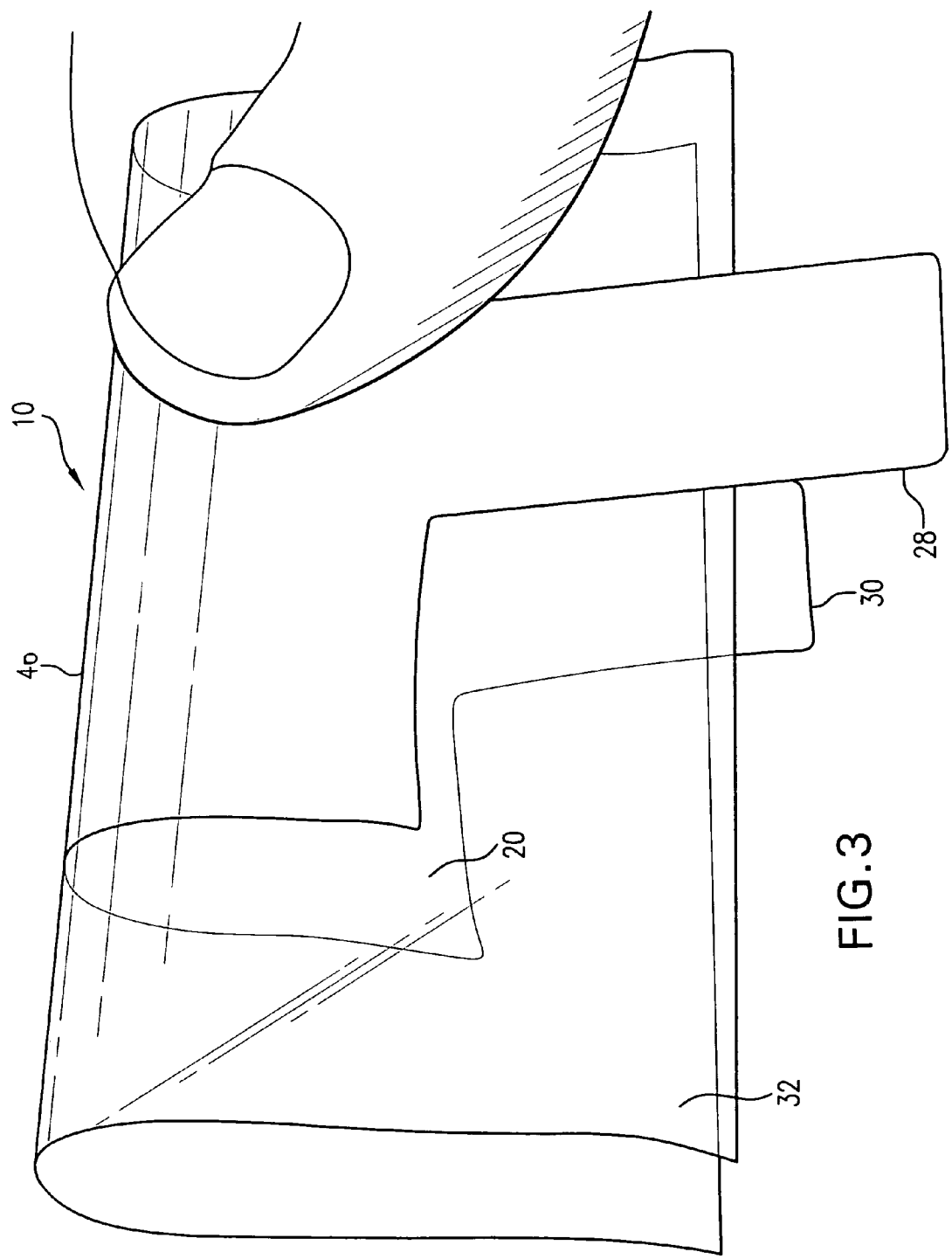
FIG. 3 is a diagram of an example of a thin flexible electrochemical energy cell.
Figure 4:
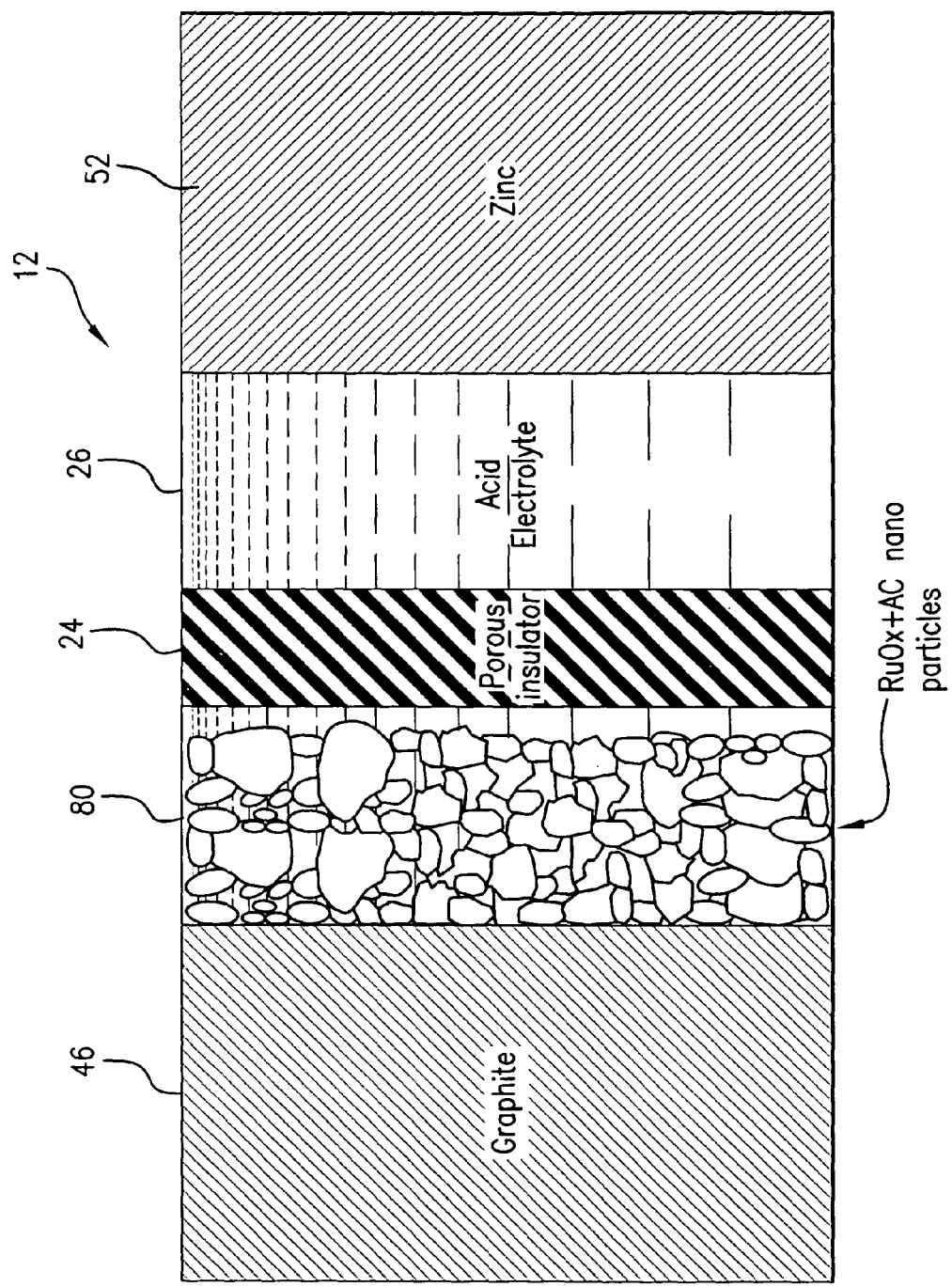
FIG. 4 is a schematic representation of an example of the basic battery cell on a large scale.
Figure 5:
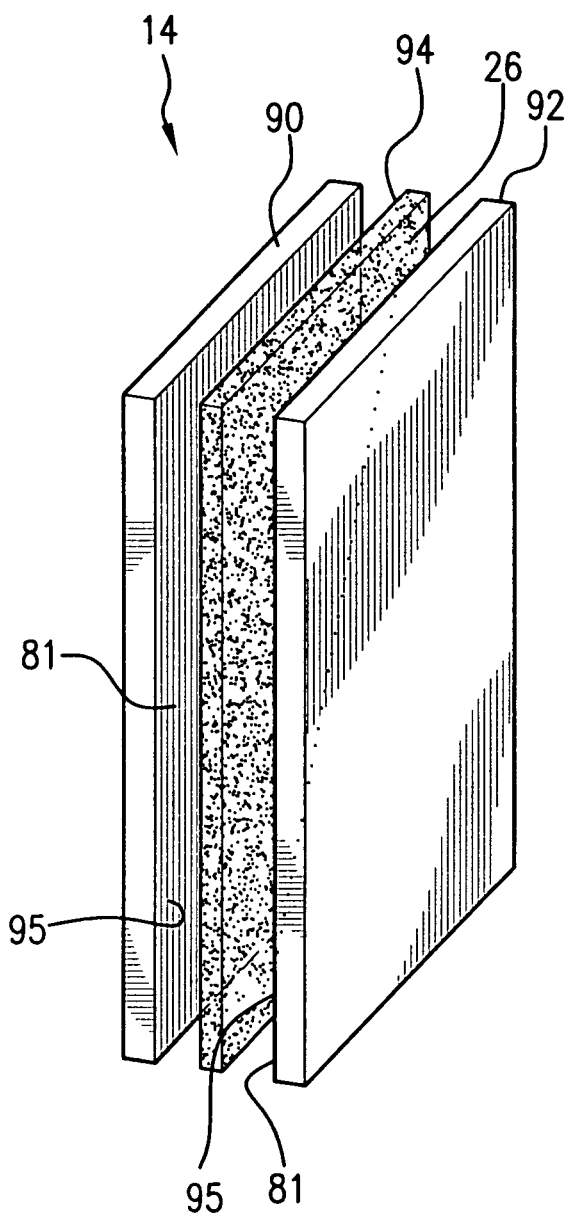
FIG. 5 is an exploded view of an example of a capacitor cell.
Figure 6:
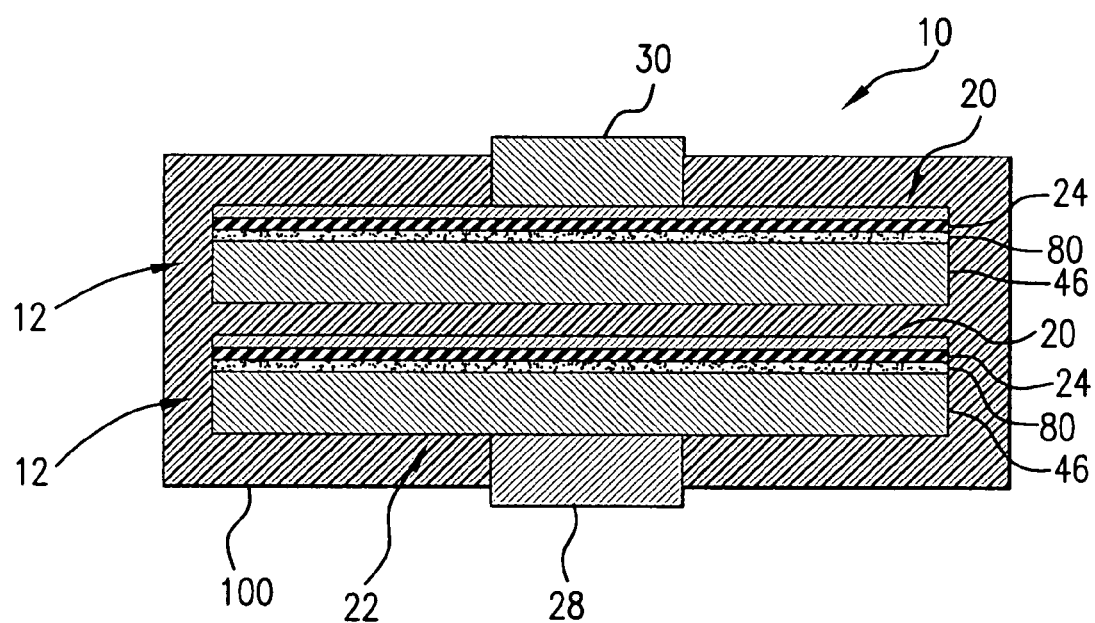
FIG. 6 is a structure of an example of a double stacked battery cell.
Figure 7:
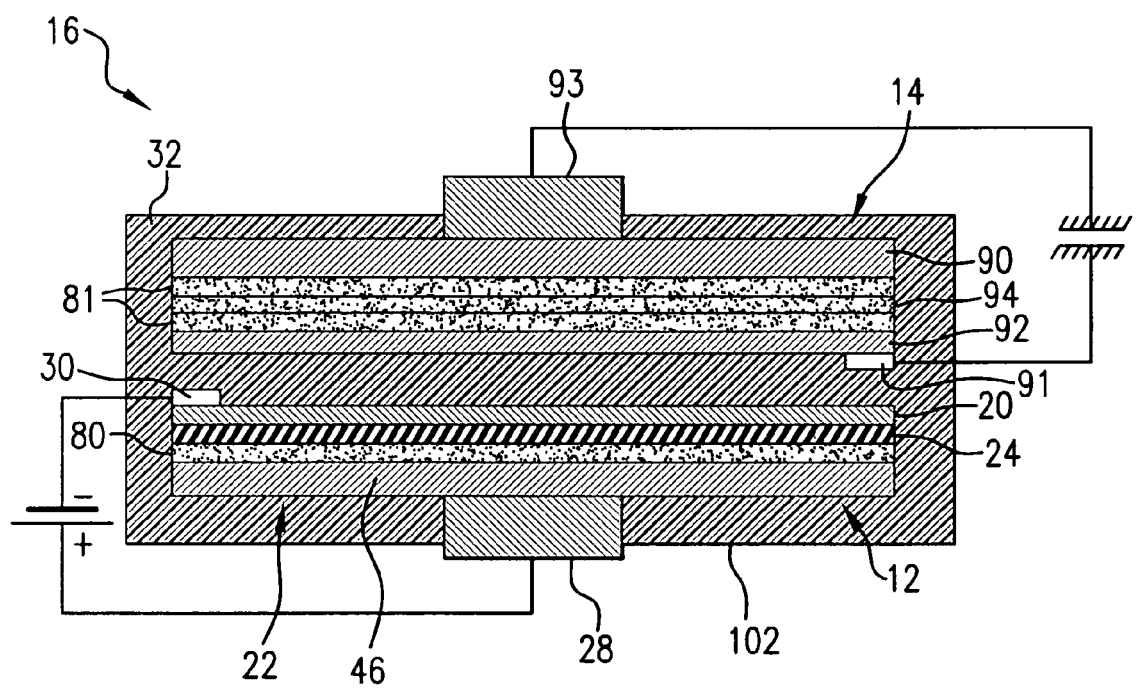
FIG. 7 is a simplified schematic representation of an example of a cross-section of the battery/capacitor hybrid cell.
Figure 8:
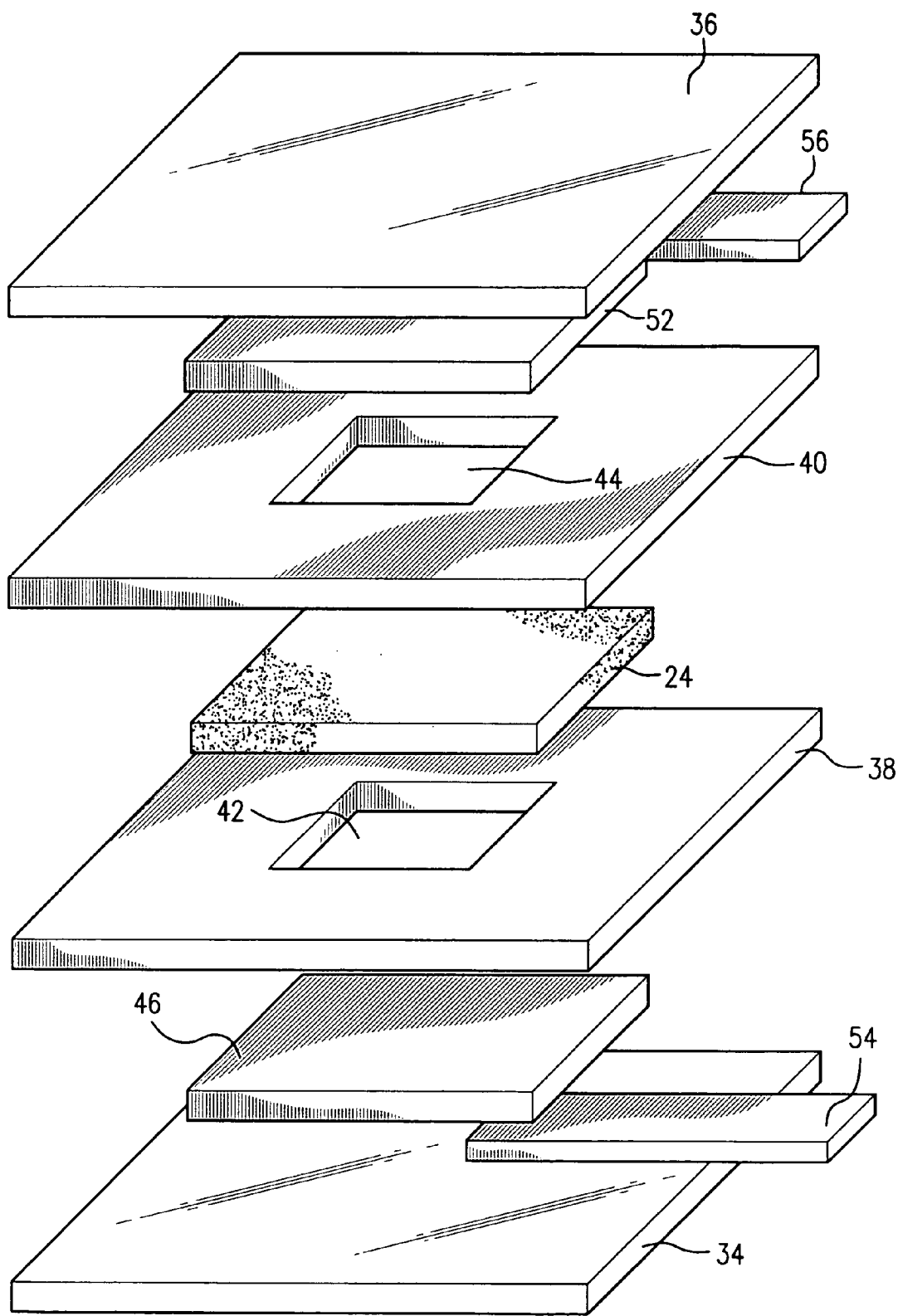
FIG. 8 is an exploded view of an example of the battery cell constituents

Referring to FIGS. 1-7, a flexible thin electrochemical cell 10 is presented which may be implemented either as a flexible thin rechargeable battery cell 12 shown in FIGS. 1, 4, 6, and 8, as a capacitor unit 14 shown in FIG. 5, or as a battery/capacitor hybrid structure 16, one example of which is shown in FIG. 7. The electrochemical energy cell 10 is a flexible, thin rechargeable energy device, and can be used in low-power, low-maintenance applications, which may be substantially planar as shown in FIG. 2, or may be flexibly bent and deformed, as shown in FIG. 3, depending on the needs of a particular application. The thin electrochemical energy cell 10 can include one or more of the following features:

a. A low voltage requirement (below 1.25V) for recharging, which when compared to a larger voltage requirement (e.g., 3-4V) can make it easier to recharge the battery remotely using microwatt-level incident RF power.

b. A flexible mechanical design, which can allow batteries to be designed to fit in non-planar contours of specified applications. The flexible design can allow the battery to be wrapped around materials and devices for applications, such as energy harvesting or changing the thermal characteristics.

c. A flexible chemical design, which can allow the designer several choices in trading off between design factors, such as the open circuit potential, internal resistivity, battery capacity, and sourced current level.

d. A use of hydrated ruthenium oxide as a cathode material in a secondary galvanic cell. Ruthenium oxide can be used in a chemical reaction (e.g., a reduction-oxidation reaction, or a redox reaction) for battery operation. A small amount of ruthenium oxide may be required in the cell. The cell is not limited to utilizing only ruthenium oxide. Other materials (e.g., manganese oxide), which can be deposited as a surface layer and capable of a redox reaction, may be formed in a battery with the disclosed techniques.

e. The cell can have flexible applicability, where the battery in the hybrid cell can be suited for sustained power supply, while the capacitor can be useful for rapid deployment of a high power which may be used for powering distributed network node devices where it may be required to keep a system running at the maintenance/sleep power level for long periods of time, while allowing for a high power draw during short periods of "activity" or "on" time periods. An example of systems that can operate in this manner include ad-hoc wireless sensor network nodes. In some cases, member nodes of these networks remain in the "listen/sleep" mode, only "waking up" a small percentage of the time to communicate their data or take instruction from other nodes in the network. In some embodiments that use a battery within remote sensors that records environmental conditions, the capacitor can charge quickly with a charging source and the battery may charge slowly, in which the capacitor can trickle charge the battery when the charging source is removed.

f. Activated carbon nanoparticle compounding can be used. In some embodiments, nanoparticles can be spread onto a sheet. The various particulate structures (e.g., cubic, hexagonal) may create non-uniformity spread the ruthenium oxide in the resultant matrix.

g. Embodiments of the cell may have a long operational life. The chemical reaction in the cell may not dissolve away material in the battery that would reduce battery life. In some embodiments, the reaction may involve a chemical rearrangement, not dissolution; and hence, there may be no byproduct loss, and there can be a long battery life.

h. A redox reaction can be utilized. In some embodiments, the battery can utilize a redox reaction, and may not rely on utilizing capacitance. Some embodiments can utilize a surface phenomena for charge storage instead of a volume based phenomena.

i. Various types of substrate materials can be used.

j. Zinc can be used to minimize the thickness of the anode and cathode. Zinc can be used to reduce weight, lower the thickness of the battery, and increase the energy storage density. Zinc can be applied as a nanoparticulate material, and may be inexpensive, thin, and flexible.

k. Two or more layers can be stacked on top of one another. In some embodiments, four layers may provide a flexible structure that can be connected in various configurations and have a desired voltage. Embodiments may have direct stacking without requiring full separation on both sides of the cell. In some embodiments, the stacking may involve a film with several cells atop of it prior to next film, such that the desired battery voltage can be achieved.

l. Embodiments of the battery may be non-flammable. Because the battery may not start a fire, it can be useful for hazardous environments, such as dangerous chemical plants or places that can explode, and may be used for various applications including firefighting, military, manufacturing, chemical, and refinement activities.

m. The batteries can be configurable for various current or voltage requirements by having various parallel/series combinations.

The battery/capacitor hybrid provided in the present system can be suited to these applications at least because: (1) the battery can maintain the energy requirement for the long "sleep" periods; (2) the capacitor can provide a large current rapidly over the short periods of time when the system is consuming a high power; and (3) the (low) requirements for recharging can allow the battery/capacitor hybrid structure to be easily recharged at a distance.

Some embodiments of the thin flexible electrochemical cell presented herein can be easily integrated into a general flexible electronics matrix and may utilize some of the following concepts:

a. Some embodiments of the electrodes of the electrochemical energy cell 10 can have a maximized active surface area, e.g., an expanded surface area during power generation at the electrode surface. This can be achieved through the use of the powdered nano-particulate or particulate $RuO_2 \times H_2O$ or another material, such as manganese oxide, as an ingredient in the cathode material. The permeability of the $RuO_2 xH_2O$ paste may be assured by compounding it with graphite (activated carbon) particles or nanoparticles. This approach may also lower the internal resistance of the cell when compared to implementing the cell without the composition. The compound may form a screenable conducting paste that can be applied as an extremely thin layer over a flexible substrate, for example polypropylene, to assure a simple manufacturing and thin profile structure.

b. In some embodiments, the electrolyte may be near pH neutral or mildly acidic (pH 3-6.5) to prevent rapid dissolution of the electrode materials or package sealing materials. This requirement may be accomplished through the use of an ethylene glycol base and weakly acidic solution, or of an ethylene glycol base to which a buffered $HNO_3$ solution is added. The buffering and dilution process can create a pH=5 mixture. This electrolyte can be applied as droplets over the $RuO_2 xH_2O$/activated carbon, thus forming a gel-like mixture. A counter-electrode made from either Zn, Al, or Pb, or another oxidizable metal, can be pressed over the gel paste. The $RuO_2 xH_2O$ /activated carbon/electrolyte/ metal foil cell may have an electrochemistry that is close to that of a lead-acid battery and the redox (reduction-oxidation) reaction responsible for power generation, which is close to equilibrium, and allowing for electricity driven recharging.

c. The reaction chemistry may proceed close to equilibrium to allow electrically driven reversibility (recharging), which may be satisfied by the chemical and mechanical structure discussed above.

d. Regarding manufacturing, the electrochemical cell can have a light weight and a low volume. As will be presented in detail in further paragraphs, a second plastic sheet can be placed over the entire assemblage and the assemblage can be sealed. All the materials used in the electrochemical energy cell 10 can be flexible and extremely thin so that the resulting $RuO_2 \cdot xH_2O$/activated carbon/electrolyte/metal foil cell may be as thin as 0.5 mm and possibly lower. A typical zinc anode cell with a surface area of 4 cm$^2$ may have a weight less than 4 grams, so that a goal of having a light weight for the subject electrochemical energy cell can be attained.

Referring to FIGS. 1, 2 and 4, the thin flexible rechargeable battery cell 12, which may be a single battery cell (FIG. 1), a stacked battery cell (FIG. 6), or the battery/capacitor hybrid cell 16 (FIG. 7), includes a anode electrode unit 20, a cathode electrode unit 22, a separator layer 24 sandwiched between the anode and cathode electrode units 20 and 22, an electrolyte body 26 throughout positioned on and impregnating the separator layer 24, a positive contact terminal 28 in contact with the cathode electrode unit 22, a negative contact terminal 30 in contact with the metal anode electrode unit 20, and the sealing package 32 (e.g., Lexan) enveloping the electrochemical energy cell therewithin. In some embodiments, there may be a permeable electrically-insulating separator layer 24 saturated with the electrolyte body 26.

The thin flexible cells may be manufactured to have a wide range of sizes depending on their intended use. In a contemplated embodiment, the active surface area ranges from 0.25 cm$^2$ to as wide and long as material availability permits. The cell thickness may be limited by the thickness of the layers in use, and it is possible to construct a cell having a thickness less than 0.5 mm in some embodiments.

Cells may be stacked one to another with series or parallel connections to form an expanded cell with higher current-driving capabilities, higher specific capacity, or higher open-circuit potential as required for particular applications. Stacking may be achieved by electrical connections constructed internal or external to sealing package. In the stacked implementation, shown for example in FIGS. 6 and 7, the thickness of the resulting structure can increase commensurately with the number of stacked cells.

Referring to FIGS. 1-4, 8, as well as 9A-9J, the battery cell 12 can be manufactured from one or more of the following elements:

a. Two squares of flexible adhesive material cut and prepared to form the bottom seal layer 34 and top seal layer 36. In some embodiments, the bottom seal and top seal layers 34, 36 are squares with the edge about 10 cm (for a battery cell 12 with an active area of 4 cm×4 cm), which can be formed from non-permeable self-adhesive plastic.

b. Two squares of flexible adhesive material are cut and prepared to become the inner seal frame layers 38 and 40. In each of the inner seal frame layers 38 and 40, a square cutout 42 or 44 is formed in a central region. The dimension of the inner seal frame layer 38 and 40 may coincide with dimensions of the bottom and top seal layers 34, 36. The size of the square cutout 42, 44 can define the active area of the electrochemical energy cell 10.

c. One square flexible graphite foil is cut and prepared to become the graphite backing layer 46. The graphite foil thickness may be about 0.005 inch. The dimension of the graphite backing layer square may be larger than the edge of the cutout 42, 44 formed in the inner seal frame layers 38, 40 and smaller than the bottom seal and top seal layers 34, 36. For a battery with 4×4 cm$^2$ active area the graphite backing layer 46 can have a dimension around 6×6 cm$^2$.

d. A single square of filter paper or other separator material is cut and prepared to become the separator layer 24. The separator layer may be slightly larger than the dimensions of the cutouts 42 and 44 formed in the inner seal frame layers 38, 40. For example, for a battery with 4×4 cm$^2$ active area, the dimensions of the separator layer 24 may be around 4.25×4.25 cm$^2$. The separator 24 may be formed of glass fiber filter paper, standard cleanroom-grade tissue paper, or styrene-grafted fluorinated ethylene polypropylene among others.

e. A square of the anode metal foil is cut and prepared to become the metal anode layer 52. The dimensions of the metal anode layer 52 can be approximately the same as the graphite backing layer 46, e.g., 5×5 to 6×6 cm$^2$ for a battery with 4×4 cm$^2$ active area. The anode metal can be formed from zinc foil with a thickness of approximately 0.003 inches.

Different oxidizable metals may be used in the system to generate different open-circuit potentials to the galvanic reaction. For example, Zn, Al, and Pb may be considered for metal anode layer 52. In addition to sheets of such metals, the use of sputter coated metal powders on flexible backing material are within the scope. Zinc may be used for the metal anode layer. Aluminum may be an option for a lower-voltage cell, which may be recharged with a very low (smaller than 1 volt) charging potential.

f. Two strips of the anode metal foil are cut and prepared to become the contact strips 54, 56. The dimensions of the contact strips may be in the approximate range of 1 cm×7 cm.

g. The powdered cathode material 58 can be a mixture of a powder of hydrated ruthenium oxide (note that the chemical composition $RuO_2 \cdot xH_2O$, sometimes be referred to and abbreviated in this disclosure as RuOx), particles or nanoparticles and activated (chemical composition: C) nanoparticles. The volume ratios of the materials in the mixture may vary from 0%:100% to 100%:0%, depending on the requirements for battery/capacitor and current sourcing capabilities. The battery/capacitor hybrid nature of the device is adaptable by modifying this ratio. For example, the activated carbon to hydrated ruthenium oxide volume ratio may change between 10:1 and 1:10. This corresponds to a weight ratio between approximately 16:1 RuOx:AC and 1:6.3 RuOx:AC. In cases, such as for a capacitor design, only activated carbon without hydrated ruthenium oxide may be used. Additionally, for a battery/capacitor hybrid design, the volume ratio may be 50%:50%. The total weight of the powder mixture used to create the paste may be less than a gram per cm$^2$ of active battery/capacitor area. For example, in some embodiments the total weight of the powder mixture used to create the paste may be less than 0.25 gram per cm$^2$ of active battery/capacitor area.

h. The electrolyte may be a mixture of ethylene glycol, boric acid, citric acid, and ammonium hydroxide. Other electrolyte compositions can be implemented (e.g., ammonium hydroxide and/or citric acid may not be added to the composition in some embodiments). The mixture in the range of pH3 to pH7 (e.g., in the range of pH3-pH6.5) is used in the subject cell. As an example, the boric acid may be prepared with 5 gram of boric acid that is dissolved in 100 cc of water. The citric acid may be prepared with 40 mg of citric acid crystals dissolved in 100 cc of water. The volume percentages of the components in the electrolyte may be as follows: ethylene glycol (0%-50%), boric acid (30%-100%), and citric acid (0%-20%), to make up the volume. Ammonium hydroxide may be added in trace amount (less than 5 mL per 100 mL of electrolyte).

One possible mode of electrolyte is to use the following volume ratios: 45% ethylene glycol, 37% boric acid, 18% citric acid, and 0.5 ml of ammonium hydroxide per 100 mL solution.

Ethylene glycol, when present, can be particularly useful for its high viscosity, which may allow cathode particles to be suspended in the solution and present a high surface area available for chemical and Faradaic reactions as well as for double-layer capacitance effects. The cells may have layers with other sizes and shapes that are different from the shapes and sizes described herein. For example, some cells may have layers that are several feet long and/or wide.

In some embodiments, a method for preparing an electrolyte recipe E01, for example, may be as follows:
1. Measure 5 g of boric acid powder.
2. Measure 100 mL of de-ionized DI water.
3. Mix the boric acid crystals into the water, and stir well.
4. Measure 0.4 g of citric acid powder.
5. Measure 100 mL of DI water.
6. Mix the citric acid powder into the water, and stir well.
7. Measure 45 mL of ethylene glycol.
8. Measure 37 mL of mixed boric acid, add to the ethylene glycol and mix.
9. Measure 18 mL of mixed citric acid, add to the ethylene glycol and mix.
10. Measure the pH of the mixture.
11. If the pH is less than 5, add a predetermined quantity of ammonium hydroxide ($NH_3$ or $NH_4OH$), and mix. If the pH is still less than 5, add further $NH_3$ however no more than 0.5 µL (e.g., approximately three drops) of $NH_3$ should be added.
12. Mark the E01 bottle and the acid bottles.

In an alternative implementation, the electrolyte recipe EGBA may be prepared by the following sequence of operations:
1, 2, 3. Prepare boric acid as in steps 1-3 for the E01 electrolyte.
4. Measure 50 mL of ethylene glycol.
5. Measure 50 mL of mixed boric acid, add to ethylene glycol and mix.

Boric acid used for the E01 and EGBA recipe was a 5 g per 100 mL mixture. This is a saturated mixture, as the solubility of boric acid is 4.9 g/100 mL at 20° C. The saturation to be used in the electrolyte (E01) may range between 0.5 g per 100 mL to 5 g per 100 mL.

The citric acid used was a 0.4 g/100 mL mixture. This is a weak mixture, as the solubility of citric acid is 133 g/100 mL at 22° C. The saturation used in the electrolyte (E01 as well as EGBA) may range between 0.1 g/100 mL to 40 g/100 mL.

E01 electrolyte can have the volume ratios of 45% ethylene glycol, 37% boric acid, 18% citric acid, and trace amounts of ammonium hydroxide which may be considered to be desired amounts in some embodiments. However, other ratios of the constituents are also contemplated in the present disclosure. For example,
a. The volume share of ethylene glycol may vary between 0% to 70%,
b. The volume share of boric acid may vary between 0% to 100%, but if it is 0% the citric acid is to be at least 30%,
c. The volume share of citric acid may vary between 0% to 100%, but if it is 0%, the boric acid is to be at least 30%, so that the total amount of all three liquids by volume adds to 100%.

As a variant of the E01 electrolyte with the boric acid at 50% and citric acid at 0%, the EGBA electrolyte can have volume ratios of boric acid and ethylene glycol of 50:50.

Other electrolytic materials may be considered, including organic acids, phosphoric acid and sulphuric acid.

Although the desired pH level for E01 or EGBA, or any other devised electrolyte may be 5, the resulting pH of the electrolyte mixture may vary between 3 and 6.5.

Other materials, which may be needed for the assembly of the electrochemical energy cell, may include conductive epoxy material, which may be a commercial conductive epoxy material mixed in accordance with instructions from a manufacturer.

Referring further to FIGS. 9A-9J the assemblage of the electrochemical energy cell 10, specifically of the battery cell 12 is shown. Referring to FIG. 9A, the bottom seal layer (also referred to herein as the bottom frame layer) 34 is placed on a level surface with the adhesive 60 facing upwardly. A contact strip 54 is placed on the bottom frame layer 34 with a end section 62 of it placed on the central area of the layer 34 to be covered by the graphite backing layer 46. An end 64 of the contact strip 54 extends beyond the edge of the bottom seal layer 34. The contact strip 54 thus is securely adhered to the adhesive surface 60 of the bottom seal layer 34. Further, an epoxy layer 66 is spread on the end section 62 of the contact strip 54.

Further, referring to FIG. 9B, the graphite backing layer 46 is placed on the center of the bottom frame layer 34 to cover the end section 62 of the contact strip 54 and is adhered thereto through epoxy layer 66.

Referring to FIG. 9C, the inner seal frame layer 38 is placed on the graphite backing layer 46 so that the cutout 42 thereof is centered with the graphite backing layer 46. The self-adhesive surface 68 of the inner seal frame layer 38 faces upwardly. The cathode electrode 70 shown in FIG. 9C is thus formed.

Referring to FIG. 9D, the top seal layer 36 is placed on a level surface with adhesive 72 of the top seal layer 36 facing upwardly. Next, the second contact strip 56 is placed on the top seal layer 36 with the end 74 in contact with the central area of the top seal layer 36. An end 76 of the contact strip 56 extends beyond the edge of the top seal layer 36 in a direction opposite to that of the end 64 of the contact strip 54 as presented in FIGS. 2 and 9J. The epoxy layer 78 is spread on the end 74 of the contact strip 56, and the metal anode layer 52 is placed thereon in the manner identical to the placement of the graphite backing layer 46 of the cathode electrode 70. Further, as shown in FIG. 9E, the inner seal frame layer 40 is placed on the metal anode layer 52 to result in the anode electrode unit 20.

Further, as shown in FIG. 9F, 4 drops (0.2 mL) of the electrolyte 26 are mixed with 0.5 g of the powder mixture 58 to form a paste 80 which is considered a cathode material paste. A pipette may be used to measure the amount of the electrolyte. If any powder remains dry, additional electrolyte may be added.

Referring to FIG. 9G, the paste 80 is deposited onto the active area of the graphite backing layer 46 exposed within the cutout 42 of the inner seal frame layer 38. The paste 80 is spread throughout the exposed active area of the graphite backing layer 46 to create an even and thin layer. This completes the construction of the cathode electrode unit 22 with the active cathode material 80 thereon.

Referring to FIG. 9H, the separator layer 24 is placed on the cathode electrode unit 22 so as to cover the cutout 42 with the cathode material paste 80 therewithin. The separator 24 is pressed against the cathode electrode to assure even contact. Excessive pressing is avoided in order to prevent the paste underneath the separator layer from having an uneven distribution. Referring to FIG. 9I, the separator layer 24 is impregnated with the electrolyte 26 liquid mostly near the center. The consumption of electrolyte 26 for this purpose may be approximately 1.6 mL for a battery cell 12 with an active area of 4 cm×4 cm.

Further, referring to FIG. 9J, the anode electrode unit 20 is turned so that the adhesive surface 72 thereof faces downwardly, and the top seal surface 36 faces up, and is placed on the cathode electrode unit 22 to sandwich the separator 24 therebetween. The protruding ends 64 and 76 of the contact strips 54 and 56, respectively, face in opposite directions and extend external the structure. The entire structure is pressed tightly around the edges, as shown by arrows A-A and B-B, to ensure adhesion and a complete seal to form the sealing package. The entire battery cell is gently pressed throughout the entire surface to ensure full contact of the materials.

FIG. 2 shows the resulting structure (plan view) of the structured formed by the techniques presented in FIGS. 9A-9J. Heat sealing or tape-sealing may be performed along the perimeter of the structure.

Referring to FIGS. 10A-10D, providing an alternative method of formulation the electrochemical energy cell 10 of the present concept, the top and bottom seal layers 34' and 36' are prepared with the center of each of these layers having a cutout 82 and 84, as shown in FIG. 10A, for contact terminals 28 and 30. The cutout 82, 84 may be formed as squares with the dimensions approximately 1×1 cm. Further, as presented in FIG. 10B, the graphite backing layer 46 is adhered onto the bottom seal layer 34'. The paste 80 made of the powdered cathode material and the electrolyte is spread over the active area formed on the graphite backing layer similar to the step shown in FIG. 9C. (For the formation of this active area, an inner seal layer may be used in manner similar to the step shown in FIG. 9C: The inner seal frame layer 38 is placed on the graphite backing layer 46 so that the cutout 42 thereof is centered with the graphite backing layer 46. The self-adhesive surface 68 of the inner seal frame layer 38 faces upwardly. This is not shown in FIG. 10B-D.) When the cathode electrode unit 22 and anode electrode unit 20 are prepared as shown in FIG. 10B, the separator layer 24 is impregnated with the electrolyte body 26 and sandwiched therebetween, as shown in FIG. 10C. The contact holes 82 and 84 are filled with conductive epoxy to form the negative and positive contact leads 86 and 88 to which the contact strips 54, 56 may be glued, as shown in FIG. 10D. Alternatively, the contact strips may be replaced with conductive wires. The entire structure is further sealed along its periphery by pressing the edges as shown by arrows A-A and B-B. Heat sealing or tape-sealing may be performed along the perimeter of the structure. Although the inner seal layers 38, 40 are not shown in FIGS. 10B-10D, and an alternative process is described for forming the contact terminals, the various structures and fabrication processes described with respect to FIGS. 9C-9J may be applied with respect to the configurations shown by FIGS. 10B-10D, including the same or similar design elements and manufacturing steps.

FIG. 1 shows the cross-section of the resulting structure formed by techniques presented in FIGS. 10A-10D. The plan view in this case may look similar to FIG. 2, however the contacts originate from the center of the cell instead of the edges.

The ranges for the dimensions of the design elements specified in the assemblage procedures described in the previous paragraphs, may be as follows:

1. For the top and bottom seal layers, the square edge size depends on the active area edge. A margin of at least 2 cm (and at most 5 cm) may be left around the active area on each side of the top and bottom seal layers. For a 4×4 active area battery, the square edge may range between 8 cm to 14 cm.

2. In some embodiments, the outer square edge of the inner seal frame layers has to be in the similar size range as for the top and bottom seal layers. If a stacked cell structure, such as that depicted in FIG. 6, is built, this outer square edge may be smaller than the top and bottom seal layers. The cutout edge can define the active area, which has dimensions specified by a particular application requirement.

3. The graphite backing layer thickness can depend on available raw materials, and 0.005 inch (0.127 mm) or less may be desirable in some embodiments. The edge size of the graphite backing may range between the cutout (active area) edge size and top seal edge size, and is determined thereby.

4. The separator layer thickness can depend on the available raw material and 0.015 inch (0.38 mm) or less may be desirable in some embodiments. The edge size may range between the cutout (active area) edge size and the graphite backing edge size.

5. The metal anode thickness depends on the available raw material. 0.003 inch (0.0762 mm) or less may be desirable in some embodiments. The edge size may range between the cutout (active layer) edge size and top seal edge size.

6. The size of the contact strips are wide enough to provide a sufficient conductive area and long enough to overshoot the margin of the top and bottom seal layers.

The form factor may be different from the form factor shown and described above. For example, the form factor may differ from square cells in some embodiments, and may be rectangular in shape. If a form factor other than a square is to be utilized, the shapes and planar dimensions of the cell layers may be adjusted accordingly.

The amount of powder mixture for a 4 cm×4 cm active area may vary between 0.1 g to 0.5 g. The amount can be determined by the size of the surface area. The amount of the electrolyte with which the powder mixture is mixed can be scaled from the weight of the powder mixture and should be sufficient to wet the entire amount of powder mixture. The amount of electrolyte used to dampen the separator for a 4 cm×4 cm active area may vary between 0.2 mL to 4 mL. The amount used can be sufficient to dampen the entire separator layer while ensuring that the electrolyte does not leak from the saturated separator.

Referring to FIGS. 5 and 7, the electrochemical energy cell in the form of capacitor unit 14 may be prepared which includes a pair of graphite sheets 90, 92 with a paste 81 covered thereon. The paste 81 may be formed of the powdered mixture containing hydrated ruthenium oxide particles or nanoparticles and activated carbon particles or nanoparticles mixed with the electrolyte (as discussed in previous paragraphs) or, alternatively, may include only a powder of activated carbon particles or nanoparticles suspended in the electrolyte. Two graphite sheets with the conductive paste 81 formed thereon sandwich a cellulose porous insulator layer 94 therebetween to form in combination a thin flexible capacitor cell 14.

The design presented in FIG. 5 yields an electrochemical capacitor of arbitrary geometry to meet energy storage specifications for low-power ad hoc distributed networks. The capacitor cell 14 may utilize an active surface enhancement through the use of corrugations 95 formed on the graphite sheets 90, 92. The corrugations 95 may be formed through etching and may be used to increase the effective surface area. The corrugations may be formed as square holes, or parallel trenches, or in any shape permitted by etching or other corrugation methods.

Similar corrugations may be formed on the surface of the graphite backing layer 46 underlying the paste 80 in the battery cell 12 for the purposes of active surface enhancement.

The capacitor cell 14 is implemented with an ultra-thin dielectric paste 81 based on hydrated $RuO_2 \times H_2O$ mixed with activated carbon (AC) particles or nanoparticles (or just powder of AC) in combination with acid to form a double-layer capacitor 14. The paste 81 is applied on the corrugated (or not corrugated) graphite sheets 90, 92 and dried.

The acid-resistant (for example, cellulous) porous insulator filter paper layer 94 is fitted on the graphite layer 90 or 92 with the paste 81 dried thereon, and a few drops of the electrolyte 26 are used to wet the layer 94. The electrolyte 26 includes ethylene glycol, boric acid, citric acid, and ammonium hydroxide combined in proportions similar to those used for preparation of the battery cell 12. The second graphite sheet 92 or 90 is then attached to the sub-assembly to sandwich the insulator layer 94 therebetween, and the edges of the structure are sealed each to the other. Although not shown in FIG. 5, it may be understood by a person skilled in the art, that two seal layers may be adhered to the graphite sheets 90, 92, so that when pressed together along the periphery thereof, they form the sealing package similar to the Lexan or flexible plastic package 32 of the battery cell 12 shown in FIG. 1 to seal the capacitor cell 14 therein. The thickness of the cell 14 may be less than 0.5 mm.

The capacitor cell 14 is perfectly applicable for a "stackable" design with other capacitor cells 14 or with battery cells 19.

A multi-cell battery structure or a battery/capacitor hybrid structure may be formed by stacking battery cells 12 and/or capacitor cells 14 each to the other. As an example, a double stacked cell structure 10 is shown in FIG. 6, while an example of a hybrid battery/capacitor structure 16 is shown in FIG. 7. It will be understood by those skilled in the art that FIGS. 6 and 7 represent only a specific design example, but any number of electrochemical cells may form the stacked battery structure and/or the hybrid structure, e.g., any number of battery cells 12 and/or capacitor units 14 in any order may be stackable in accordance to the principles of the present system. Furthermore, the physical placement of the capacitor units and battery cells or of the multiple battery cells integrated together in the same package as shown FIGS. 6 and 7 represent only a specific design example, and the physical placement of the capacitor units and battery cells integrated within the same package may vary.

Shown in FIG. 6, as an example only, but not to limit the scope of the protection available for the present stacked battery cell, the thin flexible electrochemical energy cell 10 includes two stacked battery cells 12 sealed in a single sealing (Lexan or other plastic) package 100. Each battery cell 12 includes the graphite layer 46 with the paste 80 deposited thereon, the separator layer 24 impregnated with the electrolyte 26, and the anode electrode 20. The paste 80 is a powdered mixture containing hydrated ruthenium oxide particles or nanoparticles and activated carbon particles or nanoparticles suspended in the electrolyte 26. The positive contact terminal 28 and negative terminal 30 are attached to the cathode 22 and anode 20 of the respective battery cells.

The battery cells 12 may be interconnected in parallel and/or series by internal and/or external conductors (not shown in the Drawings).

Referring to FIG. 7, a particular design example of the hybrid battery/capacitor cell 16 is shown, which shows the battery cell 12 stacked with the capacitor cell 14. The structure serves as an example, and any number of the cells 12 and 14, as well as various arrangements of interconnections therebetween is also contemplated in the present concept. As shown in FIG. 7, the hybrid cell 16 may include the battery cell 12 stacked with the capacitor cell 14 and interconnected by internal or external connectors (not shown) in parallel and/or series, as dictated by a particular application. The battery cell 12 includes the graphite layer 46 with the paste 80 dispersed thereon, the separator layer 24 wetted with the electrolyte, and the anode electrode 20. Positive and negative leads 28, 30 are coupled to the cathode 22 and anode 20. The capacitor 14 portion of the hybrid cell 16 includes a pair of graphite layers 90, 92 with the paste 81 deposited on each of them. The dielectric layer 94 impregnated with the electrolyte is sandwiched between the graphite sheets 90 and 92. Contact terminals 91, 93 are formed on the graphite sheets 90, 92. The entire stacked structure is enveloped in the sealing package 102. While not shown in the drawing of FIG. 7, the inner seal frame layers 38 and 40 may be used in a manner similar to described above and depicted in FIG. 9.

Multiple samples of the single, double stacked, and hybrid electrochemical energy cells have been fabricated and subjected to the following tests:

a. Cell charging, for which a constant current was applied to the cell and the voltage across the cell was monitored. For an ideal capacitor, the voltage first increased linearly before saturating at its working potential;

b. Cell charging, for which a constant voltage was applied to the cell;

c. Load discharge, for which a load was attached across the cell and the potential was monitored. This was done with fresh cells just fabricated, cycled cells which were previously load discharged, and charged cells (current charged);

d. Self discharge, for which the potential across the cell was measured periodically with no load attached. This test was conducted with fresh cells, cycled cells, and charged cells.

The potential obtained from the cell self-discharge of the cells over multiple weeks is presented in Table 1.

TABLE 1

| Cell | Day 1 | Day 7 | Day 14 | Day 22 | Day 31 |
| --- | --- | --- | --- | --- | --- |
| Single (not tested before) | 1.18 V | 1.19 V | 1.19 V | 1.17 V | 1.15 V |
| Single (tested) | 1.13 V | 1.05 V | 1.09 V | 1.08 V | 1.11 V |
| Double Stacked (tested) | 1.60 V | 1.57 V | 1.36 V | 1.36 V | 1.25 V |

In Table 1, the "not tested before" single cell is a cell that was not subjected to any load discharge or current charging, while the "tested" cells have been subjected multiple times to both current charging and load discharges. The potential across each cell is seen to remain stable over multiple weeks.

Figure 11:
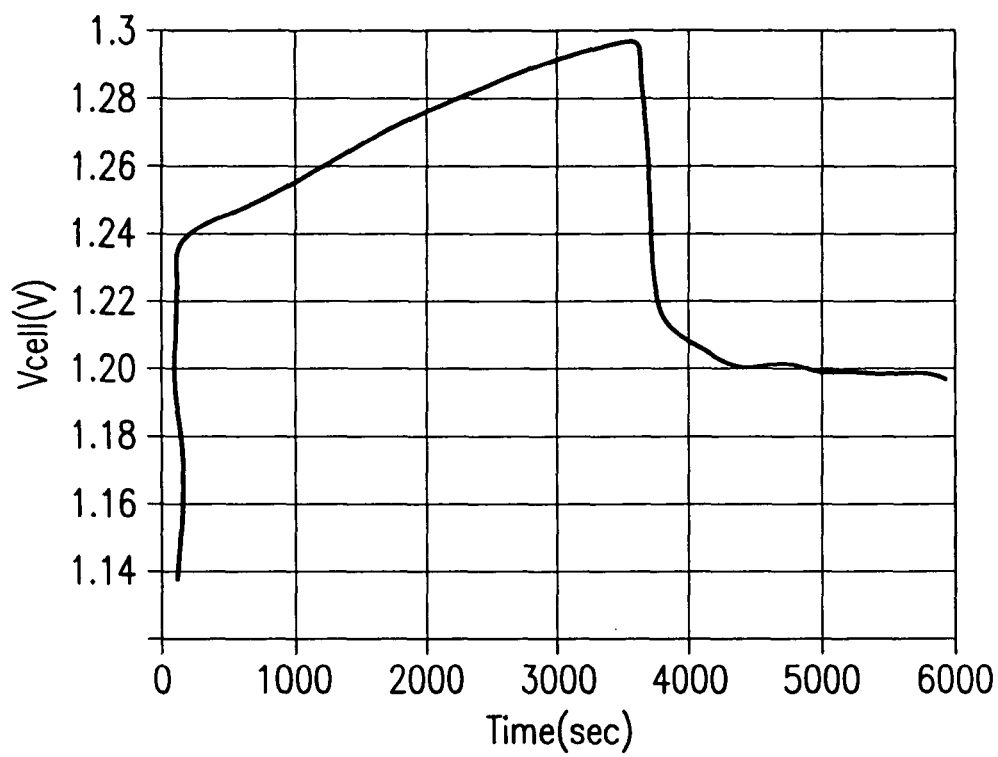
FIG. 11 is a diagram representing an example of the cell potential during constant 100 μA current charging.

FIG. 11 illustrates the cell potential during constant 100 μA charging. The cell capacitance was estimated to be about 4.5 F.

Figure 12:
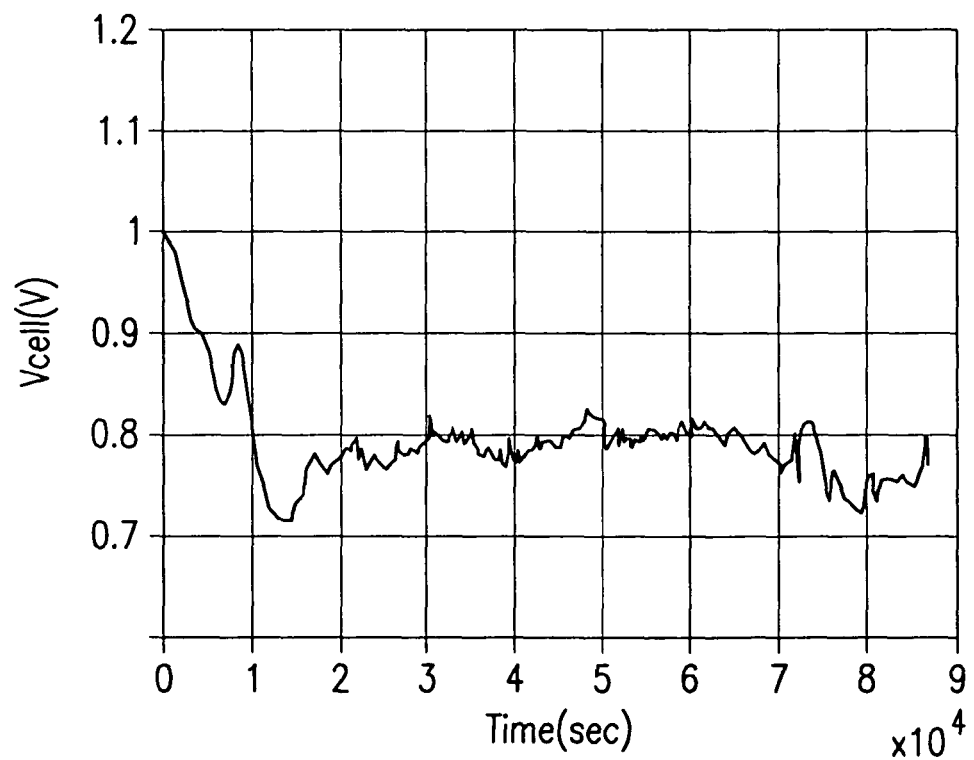
FIG. 12 is a diagram representing an example of a discharge of a single graphite/zinc cell with 100 kOhm load.
Figure 13:
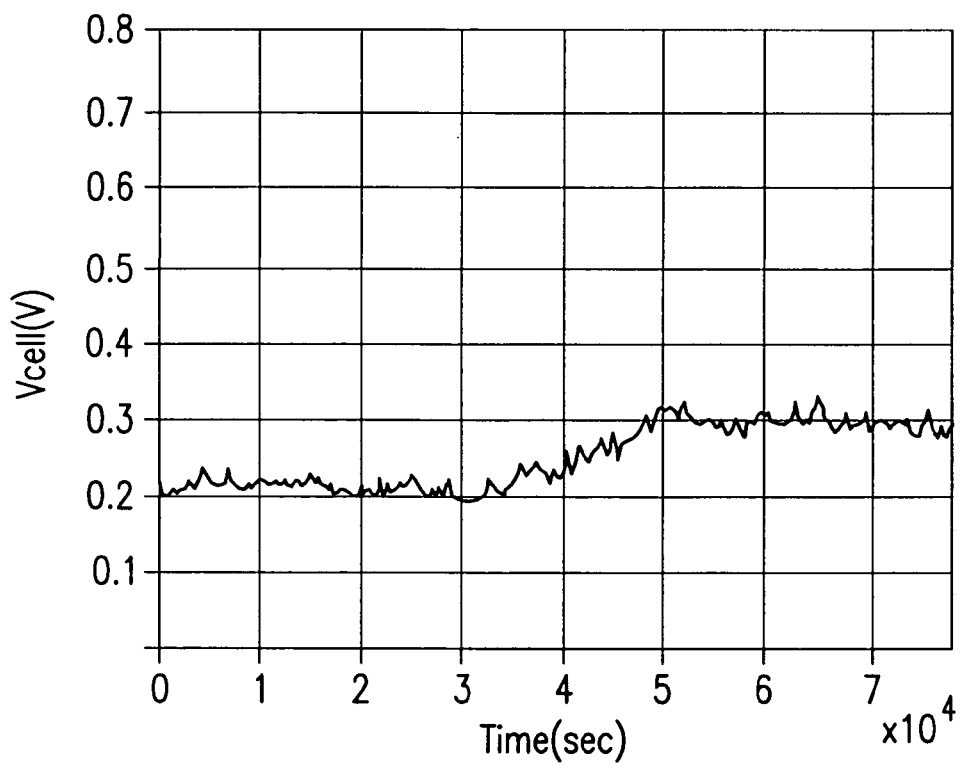
FIG. 13 is a diagram representing an example of a discharge of a single graphite/zinc cell with 10 kOhm load.

The 100 kOhm load discharge of a single cell is presented in FIG. 12. The initial voltage of the cell was 1.2V and the cell potential during the discharge was monitored for 2.5 hours. The result of a similar test conducted with a 10 kOhm load is plotted in FIG. 13. In both tests, after discharging the cell, self-charging was observed. In FIG. 12 the potential across the cell drops below 0.8V during discharge and with the load still connected, the potential rises and remains around 0.8V for more than one hour. The same behavior is displayed in FIG. 13 under 10 kOhm load discharge.

Figure 14:
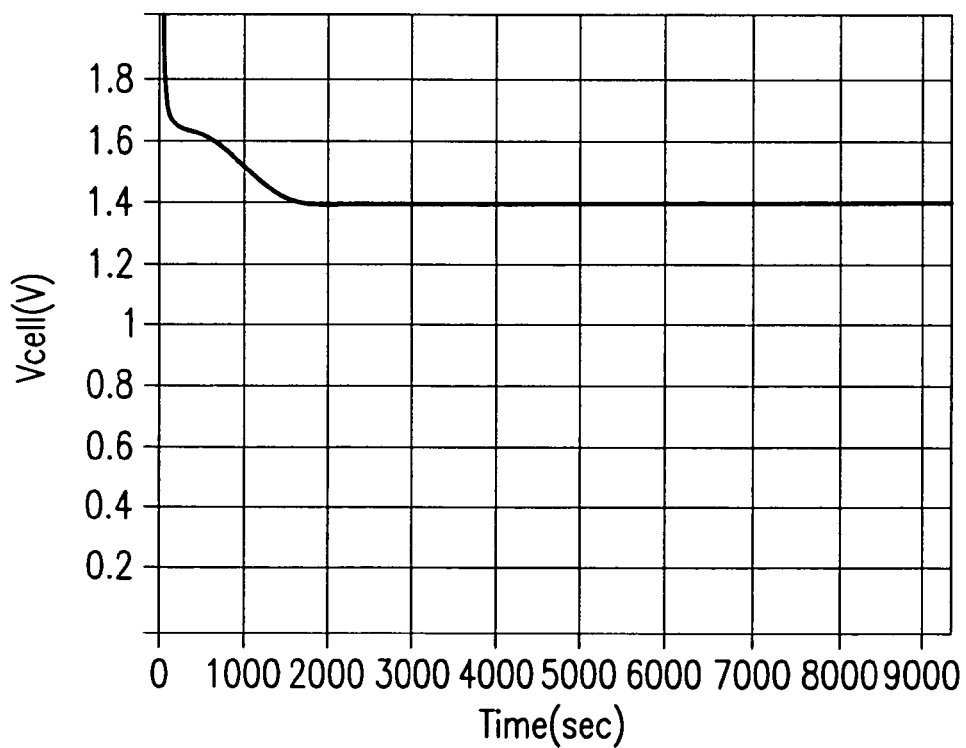
FIG. 14 is a diagram representing an example of a discharge of a double stacked graphite/zinc cell with 100 kOhm load.
Figure 15:
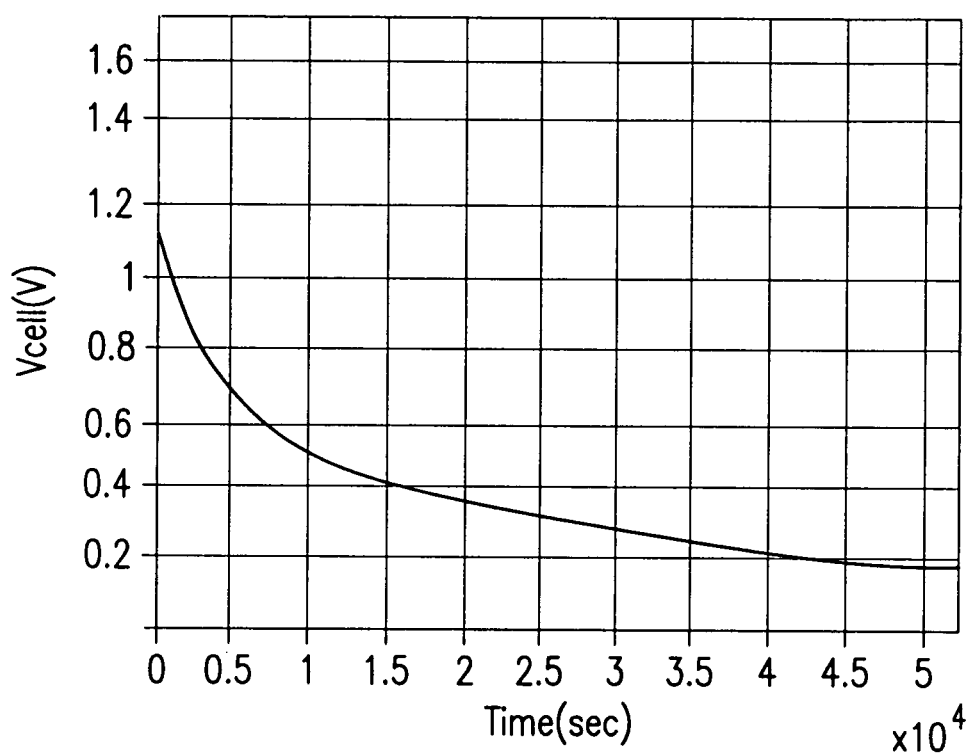
FIG. 15 is a diagram representing an example of a discharge of a double stacked graphite/zinc cell with 5 kOhm load.

The double stacked cell was also discharged with 100 kOhm load and 5 kOhm load. The recorded cell discharge potentials are shown in FIGS. 14 and 15, respectively. In FIG. 14, the discharge was conducted after 100 µA current charging during 60 seconds. During current charging, the potential across the cell increased to 1.8V. Once the 100 kOhm load is connected, the cell potential stays above 1.6V (internal potential presented in Table 1) and then decreases. For the diagram shown in FIG. 15, no prior current charging of the cell was conducted. The initial voltage of the cell was 1.6V. The stacked structure stored 30 J/cm$^3$ while the single graphite/zinc cells stored 22 J/cm$^3$.

Figure 16:
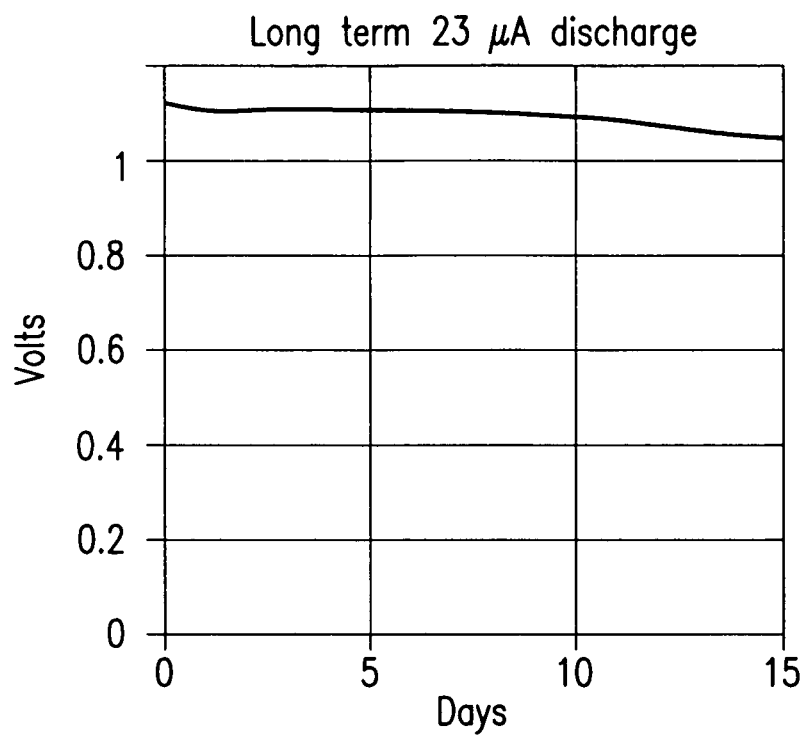
FIG. 16 is a diagram representing an example of a discharge curve of a hybrid battery/capacitor cell.

FIG. 16 shows a diagram representing discharge curve of the battery/capacitor cell presenting a long term discharge which "holds" for over 15 days.

Figure 17:
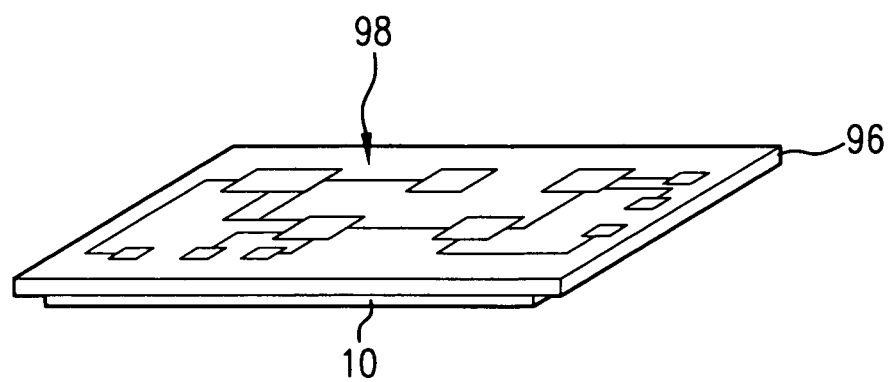
FIG. 17 is a schematic representation of an example of the IC module (electronic matrix) with the electrochemical energy cell attached thereto.

FIG. 17 shows one particular application of the flexible thin electrochemical energy cell 10 for the IC matrix. The cell film 10 is glued to the wafer 96 with IC circuitry 98 formed thereon. The electrochemical energy cell 10 is electrically coupled to the IC circuitry 98 for powering the structure.

The description above is intended to illustrate possible implementations and is not restrictive. Many variations, modifications and alternatives will become apparent to the skilled artisan upon review of the disclosure. For example, method steps equivalent to those shown and described may be substituted therefore, elements and methods individually described may be combined, and methodologies described as discrete may be distributed across many algorithm techniques. While this disclosure contains many specifics, these should not be construed as limitations or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. The scope of the disclosure should therefore be determined not with reference to only the particular descriptions above, but also with reference to the appended Claims, along with their full range of equivalence.

What is claimed is:

1. A rechargeable electrochemical energy cell, comprising:
    at least one rechargeable battery cell including:
        an anode electrode unit having a layer of zinc(Zn) or lead a cathode electrode unit; and
        a first electrolyte body sandwiched between said anode and cathode electrode units, wherein said cathode electrode unit includes a cathode material comprising a powder mixture of a powder of $RuO_2 \times H_2O$ with activated carbon (AC) particles or nanoparticles suspended in a second electrolyte body,
    wherein said at le at one rechargeable battery cell is flexibly bendable and twistable, and
    wherein said anode electrode unit includes an anode material substantially free of ruthenium oxide.

2. The rechargeable electrochemical energy cell of claim 1, further comprising:
    a permeable electrically insulating separator layer saturated with said first electrolyte body, said separator layer being sandwiched between said anode and cathode electrode units contiguous to said cathode material and a material of the anode electrode unit.

3. The rechargeable electrochemical energy cell of claim 2, wherein said separator layer comprises a material that is porous to ions in liquid and is electrically non-conductive.

4. The rechargeable electrochemical energy cell of claim 2, wherein said separator layer comprises a glass fiber filter paper, a cleanroom-grade tissue paper, or styrene-grafted fluorinated ethylene polypropylene.

5. The rechargeable electrochemical energy cell of claim 1, wherein a volume ratio of the powder content of $RuO_2 \times H_2O$ to the powder content of AC in said powder mixture varies in a range from 10:1 volume ratio to 1:10 volume ratio.

6. The rechargeable electrochemical energy cell of claim 1, wherein a volume ratio of the powder content of $RuO_2 \times H_2O$ to the powder content of AC in said powder mixture is 50%:50%.

7. The rechargeable electrochemical energy cell of claim 1, wherein each of said first and second electrolyte bodies has pH in the range of 3 to 6.5.

8. The rechargeable electrochemical energy cell of claim 7, wherein each of said first and second electrolyte bodies includes materials from the group of materials consisting of: ethylene glycol, boric acid, citric acid, ammonium hydroxide, organic acids, phosphoric acid, and sulphuric acid.

9. The rechargeable electroehemical energy cell of claim 8, wherein each of said first and second electrolyte bodies is a solution including a mixture of materials comprising approximately 45% of ethylene glycol, 37% of boric acid, 18% citric acid, and 0.5 mL animonium hydroxide per 100 ml of said solution.

10. The rechargeable electrochemical energy cell of claim 1, further comprising a backing layer of conductive graphite, said cathode material being spread on a predetermined area of said backing layer of conductive graphite.

11. The rechargeable electrochemical energy cell of claim 1, further comprising a positive lead contact and a negative lead contact, each electrically connected to respective of said cathode electrode unit and said anode electrode units.

12. The rechargeable electrochemical energy cell of claim 1, further comprising at least one capacitor cell electrically coupled to said at least one rechargeable cell, thereby forming a batter/capacitor hybrid structure, said at least one capacitor cell including:
    a pair of graphite layers,
    a second paste having a powder made of $RuO_2 \times H_2O$ particles or nanoparticles, and activated carbon (AC) particles or nanoparticles suspended in an electrolyte, said second paste being dispersed on a predetermined area of each of said graphite layers, and an insulting layer sandwiched between said graphite layers.

13. The rechargeable electrochemical energy cell of claim 12, wherein said at least one capacitor cell further includes first and second contacts, each electrically coupled to a respective one of said pair of graphite layers.

14. The rechargeable electrochemical energy cell of claim 12, wherein said graphite layers have corrugation formed on a surface thereof underlying said second paste.

15. The rechargeable electrochemical energy cell of claim 1, wherein a range of a thickness of the rechargeable electrochemical energy cell is 1 mm or lower.

16. An energy storage cell, comprising;
a pair of graphite layers; and
a dielectric layer sandwiched there between,
wherein a respective surface of each of said graphite layers is formed with corrugation disposed substantially on said respective surface in a non-contact relationship with a surface of said each graphite layer opposite to said respective surface and covered with a paste containing a powder selected from the group consisting of: $RuO_2 \times H_2O$ particles or nanoparticles, and activated carbon (AC) particles or nanoparticles, suspended in an electrolyte, and
wherein said energy storage cell is flexible bendable and twistable.

17. The energy storage cell of claim 16, wherein the dielectric layer comprises a cellulous porous insulator.

18. The energy storage cell of claim 16, wherein a thickness of the energy storage cell is 0.5 mm or less.

19. An electrochemical battery cell comprising:
an anode electrode layer;
a cathode electrode layer; and
a first electrolyte body sandwiched between the anode and the electrode layers, wherein the cathode electrode layer includes a cathode material having at least a powder mixture of a powder of $RuO_2 \times H_2O$ with activated carbon (AC) particles or nanoparticles suspended in a second electrolyte body, wherein the electrochemical cell is flexibly bendable and twistable to assume a nor-planar shape,
wherein the electrochemical cell is configured for a reduction-oxidation (redox) reaction to generate power at a surface of one of the electrode layers, and
wherein said anode electrode layer includes an anode material substantially free of said powder of oxide included in said cathode material and wherein at least one of the cathode and electrode layers has a layer of lead (Pb) or zinc (Zn).

20. The electrochemical cell of claim 19, wherein the electrochemical cell is 1 mm or less in thickness.

21. The electrochemical cell of claim 19, wherein the electrochemical cell is less than 4 grams.

22. The electrochemical cell of claim 19, wherein the first electrolyte body is PH-neutral, and wherein said first electrolyte body includes materials from the group of materials consisting of: ethylene glycol, boric acid, citric acid, ammonium hydroxide, organic acids, phosphoric acid, and sulfuric acid.

23. The electrochemical cell of claim 19, wherein the anode electrode layer comprises aluminum (Al).

24. The electrochemical cell of claim 19, further comprising a separator layer sandwiched between the anode and cathode electrode layers, wherein the separator layer comprises a material that is porous to ions in liquid and is electrically non-conductive.

25. The electrochemical cell of claim 19, wherein a shape of the electrochemical cell and positions of the electrode layers on the electrochemical cell are configured for stacking with another electrochemical cell to electrically form a serial or parallel connection with the other electrochemical cell upon stacking.

26. The electrochemical cell of claim 19, wherein the oxide comprises manganese oxide.

27. An electrochemical cell comprising:
A hybrid battery/capacitor structure including a battery cell and a capacitor cell electrically coupled to sad battery cell,
wherein said battery cell comprises:
an anode electrode layer having a layer of zinc (Zn) or lead (Pb);
a cathode electrode layer; and
a first electrolyte body sandwiched between the anode and the cathode electrode layer, wherein the cathode electrode layer includes a cathode material containing a first powder mixture of $RuO_2 \times H_2O$ with activated carbon (AC) particles or nanoparticles suspended in a second electrolyte body;
wherein said capacitor cell comprises:
a pair of graphite layers, wherein a respective surface of each of said graphite layers is formed with corrugations disposed substantially on said respective surface in a non-contact relationship with a surface of said graphite layer opposite to said respective surface;
an insulator layer sandwiched between the graphite layers; and
a paste containing a second powder mixture of the oxide with the activated carbon particles or nanoparticles suspended in a third electrolyte body, wherein the paste is dispersed on a predetermined area of each of the graphite layers;
wherein a thickness of the electrochemical cell 1 mm or less; and
wherein the electrochemical cell is flexibly bendable and twistable to form a non-planar shape.

* * * * *